United States Patent
Ueyama

[11] Patent Number: 6,078,440
[45] Date of Patent: Jun. 20, 2000

[54] IMAGE PICKUP APPARATUS WITH A DRIVING DEVICE INCLUDING AN ACTUATOR AND FRICTION MEMBER

[75] Inventor: Masayuki Ueyama, Takarazuka, Japan

[73] Assignee: Minolta Co., Ltd., Osaka, Japan

[21] Appl. No.: 09/093,036

[22] Filed: Jun. 6, 1998

[30] Foreign Application Priority Data

| Jun. 25, 1997 | [JP] | Japan | 9-168955 |
| Jun. 25, 1997 | [JP] | Japan | 9-168956 |
| Nov. 13, 1997 | [JP] | Japan | 9-311950 |

[51] Int. Cl.[7] ..................................................... G02B 7/02
[52] U.S. Cl. ............................................................ 359/824
[58] Field of Search .................................. 359/813, 814, 359/823, 824, 822; 369/44.14, 44.15, 44.16

[56] References Cited

U.S. PATENT DOCUMENTS 5,050,157  9/1991  Miura et al. ............................ 369/215

FOREIGN PATENT DOCUMENTS

| 1-312223 | 12/1989 | Japan . |
| 3-241534 | 10/1991 | Japan . |
| 3-266267 | 11/1991 | Japan . |
| 5-144010 | 6/1993 | Japan . |
| 5-151580 | 6/1993 | Japan . |

OTHER PUBLICATIONS

"Seimitsu Kogaku Kaisha"; Precision Engineering Periodical; vol. 62; No. 4; pp. 599–603; 1996 (and English translation thereof).

Keisuke SASAE et al, "Development of a Small Actuator with Three Degrees of Rotational Freedom (3rd Report)—Design and Experiment of a Spherical Actuator", Seimitsu Kogaku Kaishi (Precision Engineering Periodical), vol. 62, No. 4, 1996, pp. 599–603.

*Primary Examiner*—Ricky Mack
*Attorney, Agent, or Firm*—Burns, Doane, Swecker & Mathis, LLP

[57] ABSTRACT

In an image pickup apparatus for automatically chasing a moving object, an image pickup optical lens system and an image pickup device are contained in a ball shaped unit. A convex spherical surface of the unit is spherically pivoted by a concave spherical surface of an inner space of a housing via ball bearings. A driving mechanism, which alternatively includes two sets of one dimensional piezoelectric actuator and friction member or one set of two-dimensional piezoelectric actuator and a friction member, moves the friction member(s) for trailing an elliptical orbits in two ways. The unit is revolved around an optional axis passing the center of a sphere constituting the convex spherical surface.

16 Claims, 24 Drawing Sheets

FIG. I

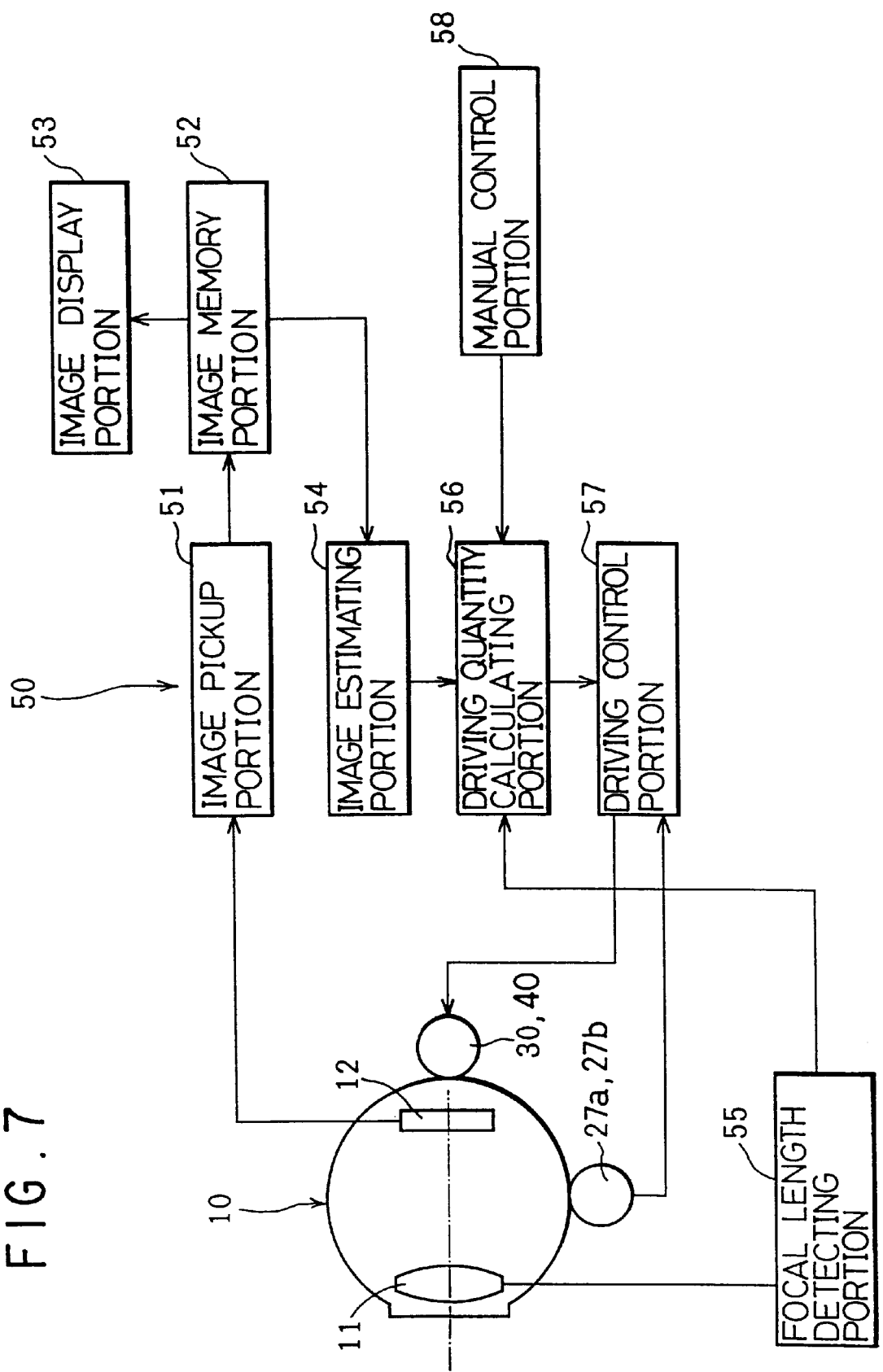

IMAGE PICKUP APPARATUS WITH A DRIVING DEVICE INCLUDING AN ACTUATOR AND FRICTION MEMBER

This application is based on patent applications No.9-168955, No.9-168956 and No.9-311950 filed in Japan, the contents of which are hereby incorporated by references.

BACKGROUND OF THE INVENTION

1. Field of the Invention

This invention relates to an image pickup apparatus which automatically pursues an object and further relates to a driving device which is suitable for driving the image pickup apparatus.

2. Description of the Prior Art

A conventional image pickup apparatus using a ginbal mechanism is shown in FIG. 24. An image pickup optical lens system and an image pickup device such as CCD (Charge Coupled Device), which are not shown in the figure, are contained in a cylindrical image pickup unit 100. The image pickup device is connected to a control unit 130 via a cable K1. The image pickup unit 100 is rotatably pivoted by a shaft 101 on a rotary frame 102. Thus, the image pickup unit 100 can be rotated around Y-axis. The rotary frame 102 is rotatably pivoted by a shaft 103 on a fixed frame 104. Thus, the image pickup unit 100 can be rotated around X-axis. The X-axis is substantially horizontal and stationary. The Y-axis moves on a plane perpendicular to the X-axis.

A gear 112 fixed on the shaft 101 engages with a gear 111 fixed on a drive shaft of a motor 113. The gears 111 and 112, the motor 113, an encoder (not shown in the figure) configure a Y-axis driving mechanism 110 for controlling an angle and direction of rotation of the shaft 101. The motor 113 and the encoder are connected to the control unit 130 via a cable K2.

Similarly, a gear 122 fixed on the shaft 103 engages with a gear 121 fixed on a rotation shaft of a motor 123. The gears 121 and 122, the motor 123, an encoder (not shown in the figure) configure an X-axis driving mechanism 120 for controlling an angle and direction of rotation of the shaft 103. The motor 123 and the encoder are connected to the control unit 130 via a cable K3.

When the image pickup apparatus automatically pursues an object, the control unit 130 processes an image data picked by the image pickup unit 100 and extracts an image of the object. The control unit 130 calculates a quantity of the displacement for displacing the image of the object to the center of a screen of a display device. The control unit 130 drives the motors 113 and 123 by using the calculated quantity of the displacement. Thus, an optical axis of the image pickup optical lens system of the image pickup unit 100 directs the object.

In the above-mentioned conventional image pickup apparatus, the Y-axis driving mechanism 110 is necessary to be integrated with the image pickup unit 100. Alternatively, the Y-axis driving mechanism 110 is necessary to be disposed inside the image pickup unit 100. Thus, the X-axis driving mechanism 120 must drive not only the image pickup unit 100 and the rotary frame 102 but also the Y-axis driving mechanism 110. The load of the X-axis driving mechanism 120 becomes heavier than that of the Y-axis driving mechanism 110.

Furthermore, the conventional image pickup apparatus needs spaces for providing the cables K1, K2 for connecting the image pickup unit 100, the moving portion of the Y-axis driving mechanism 110 and the control unit 130. Thus, it is difficult to downsize and to lighten the image pickup apparatus.

When dust-proof, humidity-proof, waterproof of the apparatus is considered, not only the image pickup unit 100 but also the Y-axis driving mechanism 110 and the X-axis driving mechanism 120 are sealed into a special housing. As a result, size of the apparatus becomes larger and structure of the apparatus is complicated.

SUMMARY OF THE INVENTION

A purpose of this invention is to provide a light, small and simple image pickup apparatus which can be driven by a small driving force.

An image pickup apparatus of this invention comprises an image pickup unit containing an image pickup optical lens system and an image pickup device, a holder for rotatably pivoting the image pickup unit around an optional axis, and a driving mechanism for applying revolving forces to the image pickup unit in two ways. A portion of an outer surface of the image pickup unit is convex spherical surface. The driving mechanism includes two sets of a friction member pressing the convex spherical surface and a one-dimensional piezoelectric actuator for moving the friction member in a predetermined direction. The two sets of the friction member and the one-dimensional piezoelectric actuator are respectively provided on two axes which cross at right angle and pass the center of a sphere constituting the convex spherical surface. Alternatively, the driving mechanism includes a friction member pressing the convex spherical surface and a two-directional piezoelectric actuator for moving the friction member. The friction member and the two-dimensional piezoelectric actuator are provided on an axis passing the center of a sphere constituting the convex spherical surface.

When the friction member(s) is(are) moved in the predetermined direction(s) by the piezoelectric actuator(s), the image pickup unit is revolved in two planes respectively including the center of the sphere constituting the convex spherical surface and the piezoelectric actuator. By controlling the directions and the quantities of the displacements of the friction member(s), the image pickup unit revolves to a desired direction. Since the image pickup unit, which is a moving portion of the image pickup apparatus, includes no element of a driving mechanism such as a gear, a motor and so on, the image pickup unit becomes light and small. Furthermore, no cable for controlling the driving mechanism is necessary. Still furthermore, since the image pickup unit is light and small, the driving mechanism provided outside the image pickup unit becomes small. Consequently, an image pickup apparatus, which has a light weight, a small size and a simple structure, and is driven by a small driving force, is obtained.

These and other objects, features and advantages of the present invention will become more apparent upon a reading of the following detailed description and accompanying drawings.

BRIEF DESCRIPTION OF THE DRAWINGS

FIG. 7 is a block diagram showing a configuration of a control unit in the first embodiment;

DETAILED DESCRIPTION OF THE PREFERRED EMBODIMENTS OF THE INVENTION

First Embodiment

A first embodiment of an image pickup apparatus of this invention is described with reference to the drawings. As can be seen from FIGS. 1 to 3, a portion of an outer surface 15 of an image pickup unit 10 is a spherical surface. A first plane is defined to include an axis A-A and an axis B-B which is parallel to the paper sheet of FIG. 1. A second plane is defined to include the axis A-A and an axis C-C (see FIG. 3) which is perpendicular to the paper sheet. The image pickup apparatus has substantially the same structure on the second plane as the structure on the first plane.

Figure 1:
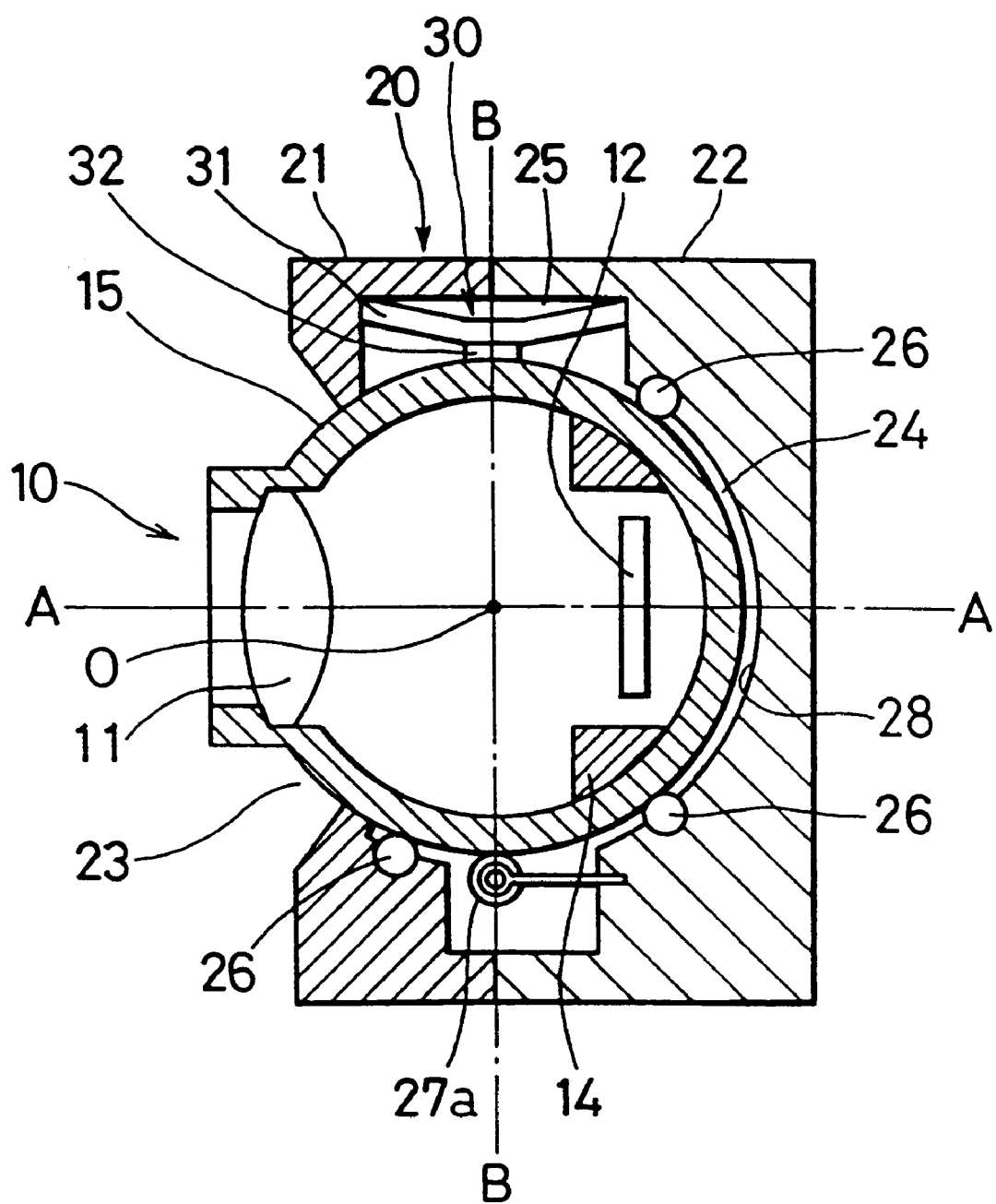
FIG. 1 is a cross-sectional view showing a configuration of a first embodiment of an image pickup apparatus of this invention.
Figure 2:
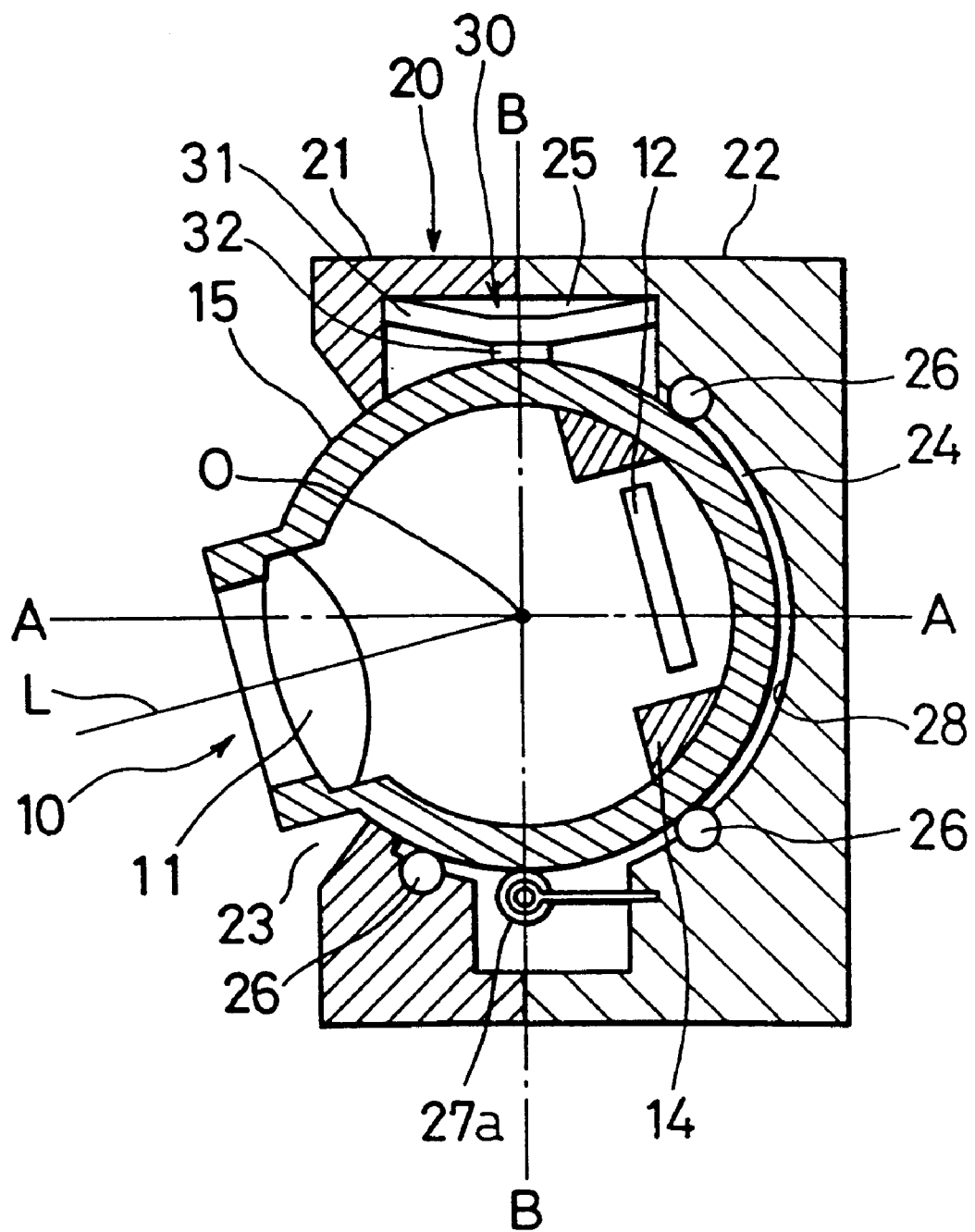
FIG. 2 is a cross-sectional view showing a moving condition of the first embodiment.
Figure 3:
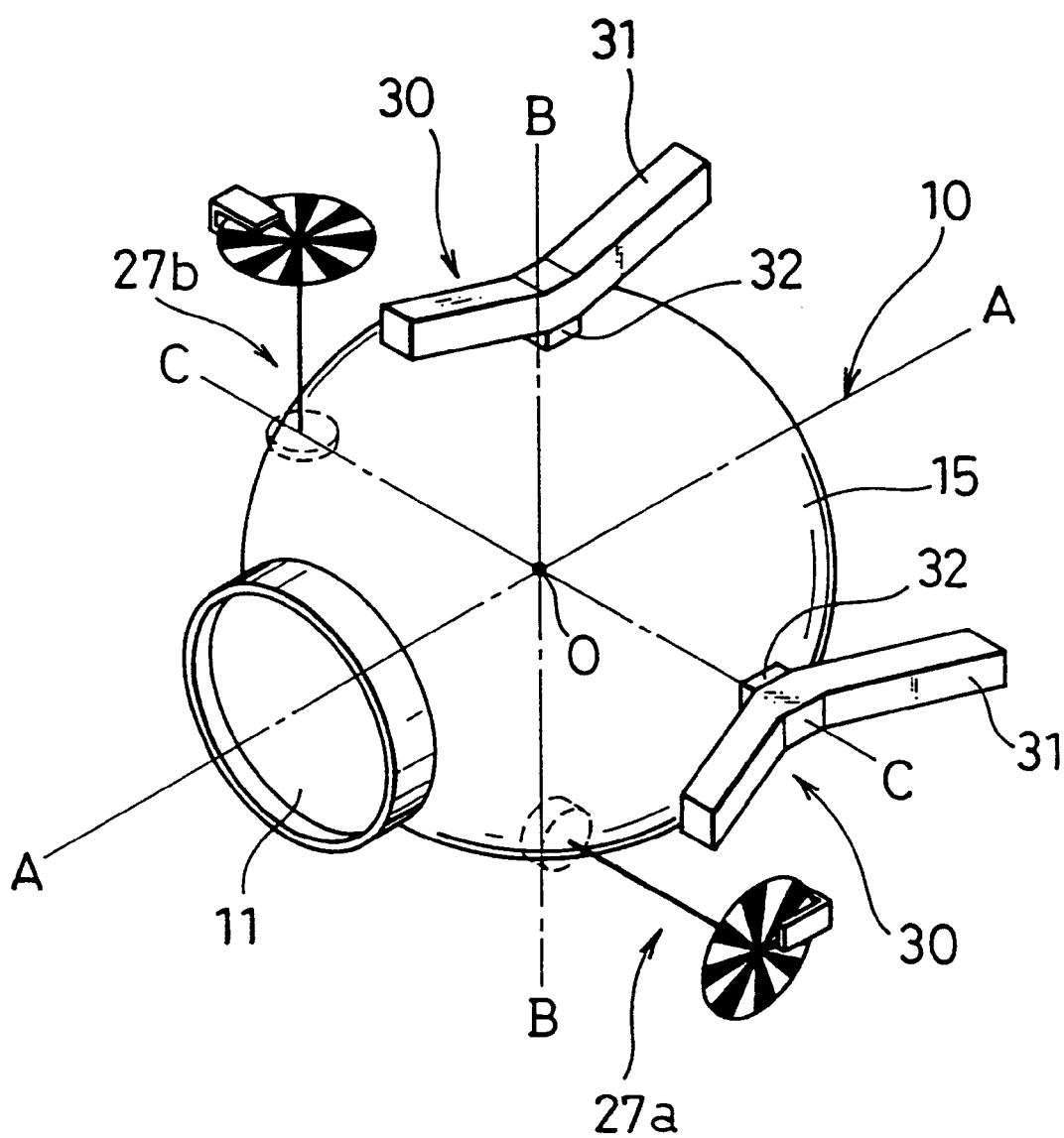
FIG. 3 is a perspective view showing a configuration of an image pickup unit and driving system thereof in the first embodiment.

As can be seen from FIGS. 1 and 2, the image pickup unit 10 includes an image pickup optical lens system 11, an image pickup device such as CCD 12 and a balance weight 14. A housing 20 can be separated into a first portion 21 and a second portion 22. The housing 20 has a substantially spherical inside space 24 for containing the image pickup unit 10. An opening 23 is formed on a front face of the housing 20. A portion of the image pickup optical lens system 11 of the image pickup unit 10 protrudes to the outside from the opening 23. Two sets of driving mechanisms 30 are provided in recesses 25 The recesses 25 are formed at a top portion and a side portion (not shown in the figure) on the concave spherical surface 28 of the space 24. Each driving mechanism 30 comprises a one-dimensional piezoelectric actuator 31 and a friction member 32 which is fixed substantially at the center of the piezoelectric actuator 31. The friction member 24 protrudes from the spherical surface of the space 24 and contacts the convex spherical surface 15 of the image pickup unit 10 with a predetermined pressure.

A plurality of balls 26 are provided between the convex spherical surface 15 of the image pickup unit 10 and the concave spherical surface 28 of the space 24 for rotatably pivoting the image pickup unit 10 around an optional axis which passes the center O of a sphere constituting the convex spherical surface 15. The balls 26 constitute ball bearings, so that the convex spherical surface 15 of the image pickup unit 10 and the balls contact at points. When the balls 26 roll on the convex spherical surface 15 of the image pickup units 10, friction forces acting between the image pickup unit 10 and the balls 26 is very small. Thus, the image pickup unit 10 can be moved by a very small driving force.

A first encoder 27a having a rotation axis which is perpendicular to the first plane is provided at a predetermined position, for example, at the bottom of the space 24 of the housing 20. The first encoder 27a senses a revolution angle (quantity of the movement) of the image pickup unit 10 in the first plane. Similarly, a second encoder 27b having a rotation axis which is perpendicular to the second plane is provided at a predetermined position, for example, at the side of the space 24 of the housing 20. The second encoder 27b senses a revolution angle (quantity of the movement) of the image pickup unit 10 in the second plane. Sensing signals from the first and second encoders 27a and 27b are respectively entered into a control unit 50 (see FIG. 7). The control unit 50 calculates the present direction of an optical axis of the image pickup optical lens system 11 of the image pickup unit 10.

Figure 4A:
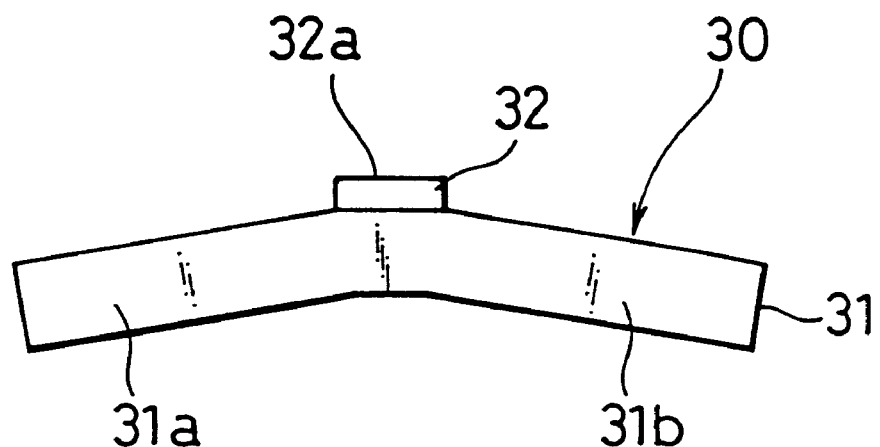
FIG. 4A is a front view showing a configuration of a driving device in the first embodiment.
Figure 4B:
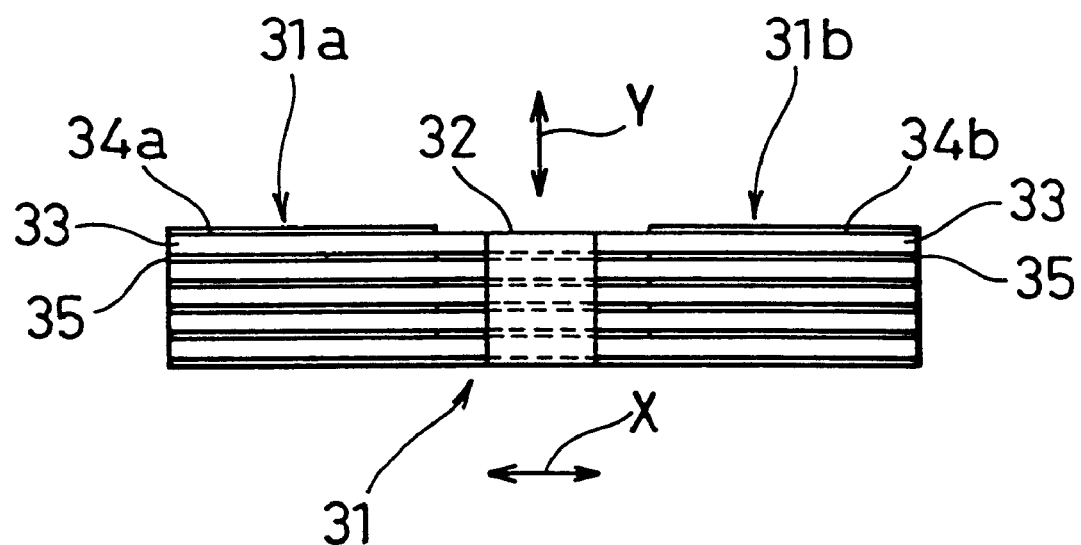
FIG. 4B is a plan view of the driving device in the first embodiment.

Details of the driving mechanism 30 is described. As can be seen from FIG. 4A, the one-dimensional piezoelectric actuator 31 has a first arm 31a and a second arm 31b which are symmetrically formed with reference to the friction member 32. A cross-sectional shape of the one-dimensional piezoelectric actuator 31 in a plane perpendicular to a contacting face 32a of the friction member 32 contacting the convex spherical surface 15 of the image pickup unit 15 is substantially herringbone shape. As can be seen from FIG. 4B, the one-dimensional piezoelectric actuator 31 is formed by repeated lamination of a first and a second partial electrodes 34a and 34b, a piezoelectric plate 33 and a common electrode 35 in a direction shown by arrow Y which is perpendicular to the herringbone shaped cross-section.

Figure 5:
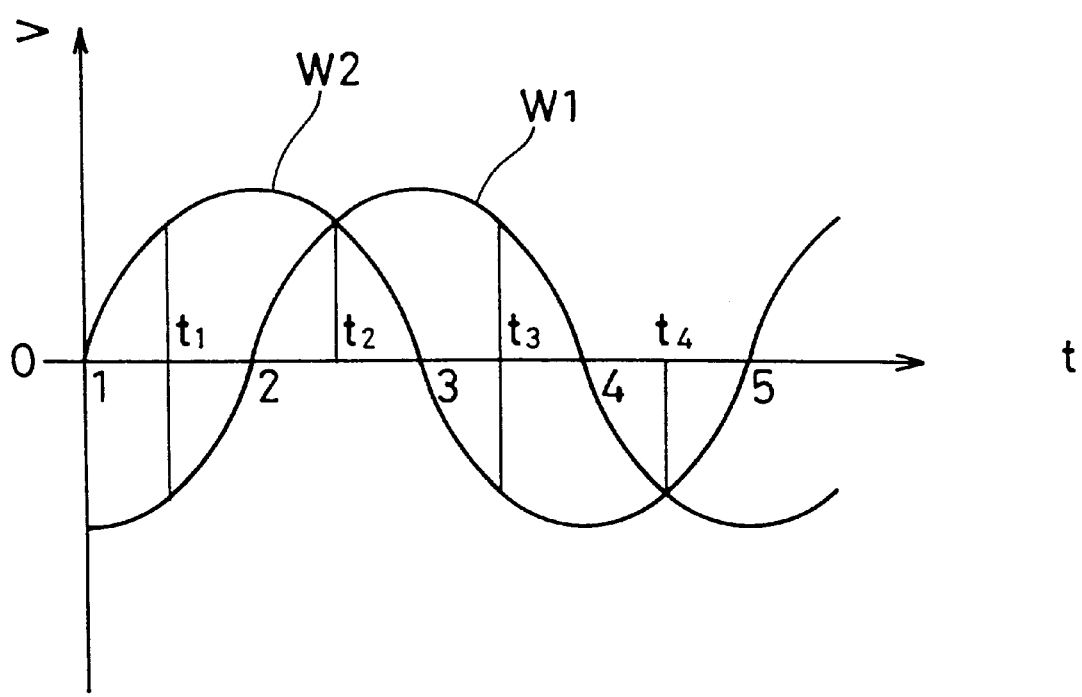
FIG. 5 is a graph showing two voltages respectively having sinusoidal waveform with a phase difference, which are commonly applicable to a piezoelectric actuator in every embodiments of this invention.

A voltage W1 having sinusoidal waveform shown in FIG. 5 is applied between the first partial electrode 34a and the common electrode 35 in the first arm 31a. A voltage W2 having sinusoidal waveform shown in FIG. 5 is applied between the second partial electrode 34b and the common electrode 35 in the second arm 31b. When the piezoelectric plate 33 expands in a direction shown by arrow Y which is parallel to a direction of an electric field, the piezoelectric plate 33 contracts in a direction shown by arrow X which is perpendicular to the direction of the electric field. In the one-dimensional piezoelectric actuator 31, a displacement in the direction shown by arrow X is utilized for moving the image pickup unit 10 which is pressed by the friction member 32.

Figure 6A:
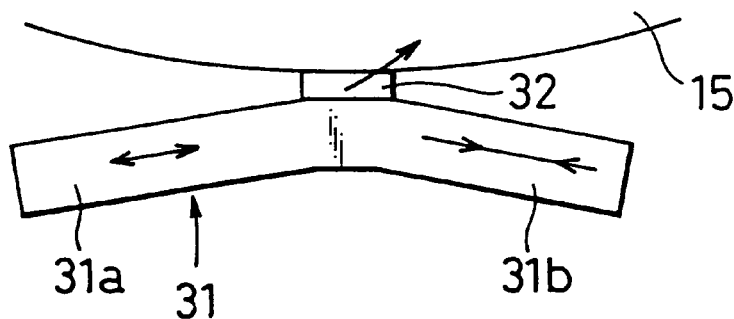
FIGS. 6A to 6D are side views schematically showing series of movement of the driving device in the first embodiment.
Figure 6B:
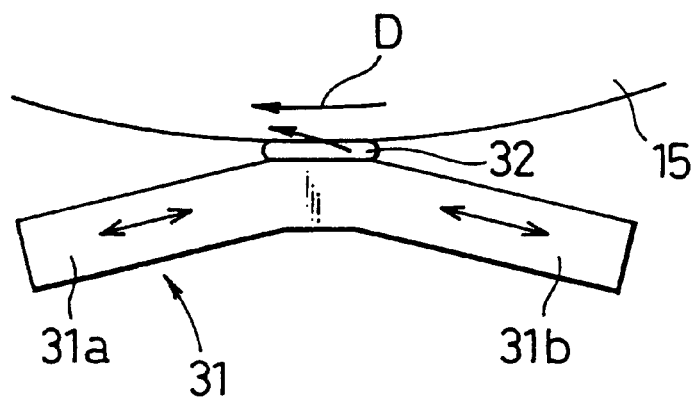
Figure 6C:
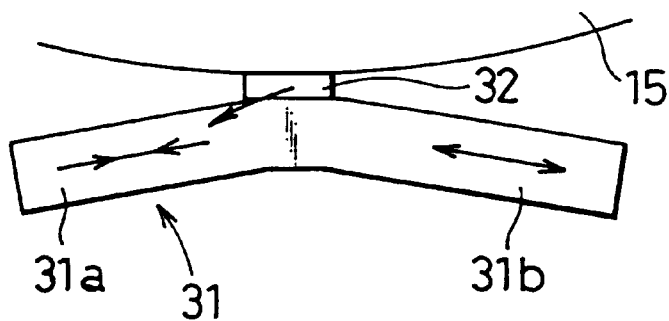
Figure 6D:
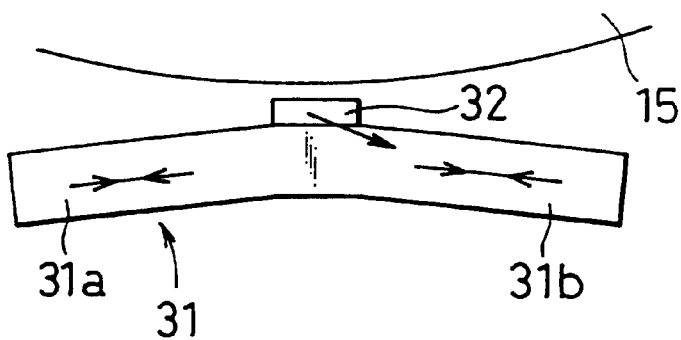

As can be seen from FIG. 5, there is a phase difference between the sinusoidal waveform of the voltage W1 and that of the voltage W2. As shown in FIG. 6A, the first arm 31a expands and the second arm 31b contracts at a time t1 shown in FIG. 5. As shown in FIG. 6B, both of the first arm 31a and the second arm 31b expand at a time t2. As shown in FIG. 6C, the first arm 31a contracts and the second arm 31b expands at a time t3. As shown in FIG. 6D, both of the first arm 31a and the second arm 31b contract at a time t4. As a result, the friction member 32 is moved for trailing an elliptical orbit. Following the elliptical movement of the friction member 32, the convex spherical surface 15 of the image pickup unit 10 is revolved as shown by arrow D in FIG. 6B.

Since the above-mentioned movement independently occurs with respect to each driving mechanism 30, the optical axis L of the image pickup optical lens system 11 of the image pickup unit 10 can be directed at a desired direction. Thus, an image of an object can be obtained. When the image pickup unit 10 is moved in an opposite direction, the phase difference between the sinusoidal waveforms of the voltages W1 and W2 should be reversed.

A block diagram of the control unit 50 is described. A hardware structure of the control unit 50 is configured by a microprocessor, a ROM (Read Only Memory), a RAM (Random Access Memory) and so on. These known elements are not illustrated. As can be seen from FIG. 7, the control unit 50 functionally comprises image pickup portion including an A/D converter 51 converting analogue image data from the image pickup device 12 to digital image data and outputting the converted digital image data; image memory portion such as RAM 52 memorizing the digital image data and so on; image display portion including a D/A converter 53 converting the digital image data memorized in the image memory portion 52 to an analogue image data such as NTSC signals and outputting the converted analogue image data to a display apparatus such as CRT; image estimating portion 54 processing the digital image data memorized in the image memory portion 52 and extracting an image of the object by comparing the present image and the last image or the like when the moving object is automatically chased; focal length detecting portion 55 detecting the present focal length of a lens when the image pickup optical lens system 11 of the image pickup unit 10 is a zoom lens; driving quantity calculating portion 56 calculating driving quantities such as frequencies, quantity of the phase difference, direction of the phase difference between the voltages W1 and W2 shown in FIG. 5 in consideration of the focal length of the lens for shifting the image of the object to the center of a screen of the display apparatus; driving control portion 57 controlling the driving mechanisms 30 (one-dimensional piezoelectric actuators 31) using the driving quantities calculated by driving quantity calculating portion 56 and the sensing signals from the first and second encoders 27a and 27b; manual control portion 58 for manually controlling the optical axis L of the image pickup optical lens system 11 of the image pickup unit 10 with monitoring the image displayed on the screen of the display apparatus.

Second Embodiment

A second embodiment of an image pickup apparatus of this invention is described with reference to the drawings. In the above-mentioned first embodiment, two sets of the driving mechanisms 30 respectively including the one-dimensional piezoelectric actuator 31 are used. The second embodiment, however, use only one driving unit with a two-dimensional piezoelectric actuator. Elements designated by the same numerals in the first embodiment are substantially the same as those in the first embodiment. Thus, the explanation of them are omitted.

Figure 8:
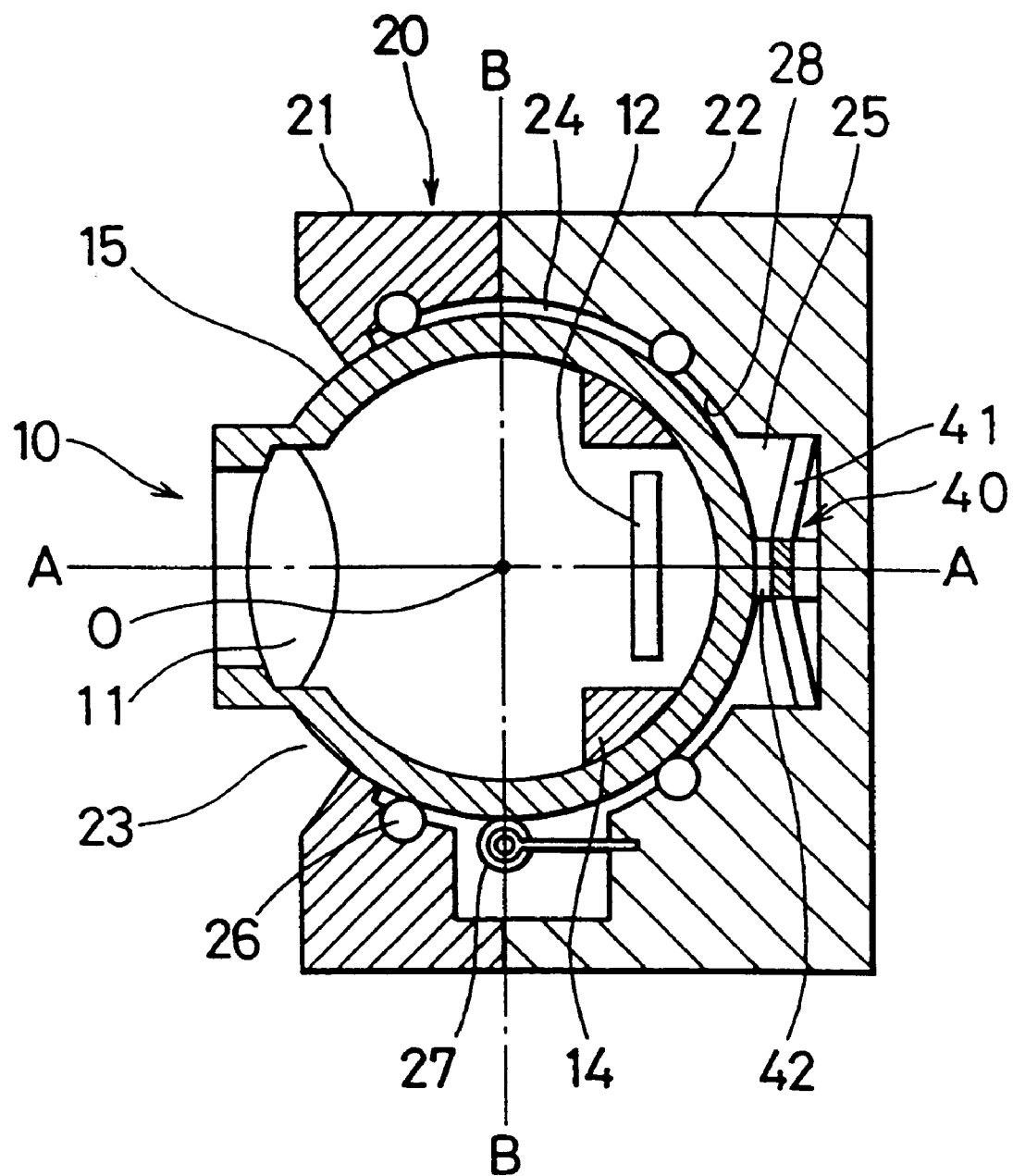
FIG. 8 is a cross-sectional view showing a configuration of a second embodiment of an image pickup apparatus of this invention.
Figure 9A:
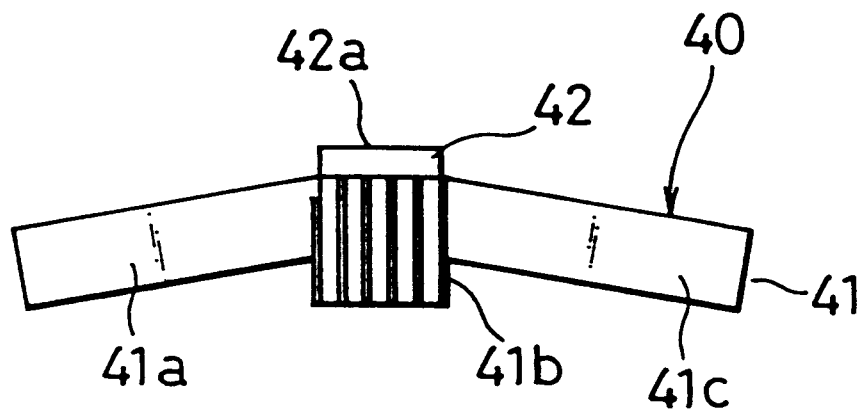
FIG. 9A is a front view showing a configuration of a driving device in the second embodiment.
Figure 9B:
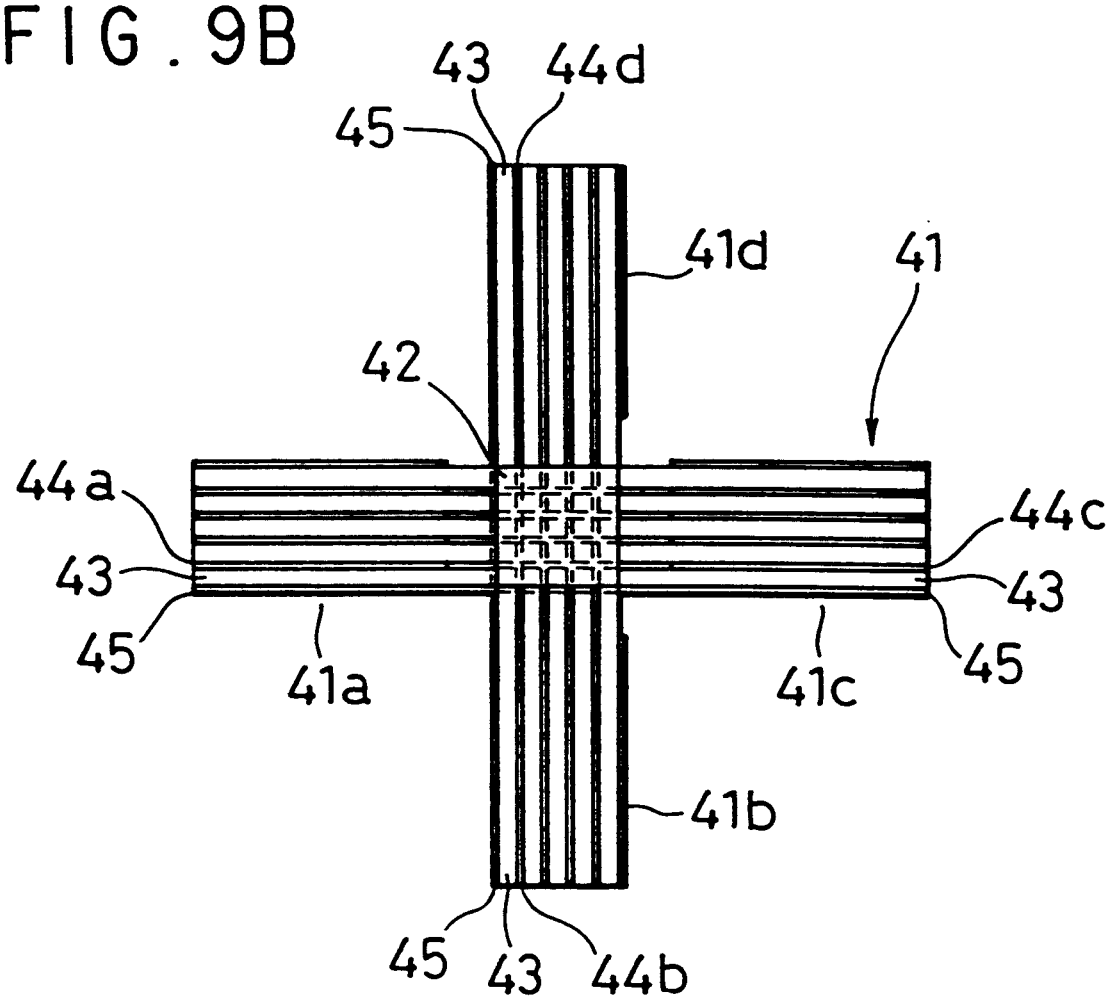
FIG. 9B is a plan view of the driving device in the second embodiment.

As can be seen from FIG. 8, a recess 25, in which a driving mechanism 40 is provided, is formed at a back portion with respect to the opening 23 on the concave spherical surface 28 of the space 24. The driving mechanism 40 comprises a two-dimensional piezoelectric actuator 41 and a friction member 42 which is fixed substantially at the center of the two-dimensional piezoelectric actuator 41. As can be seen from FIG. 9B, the two-dimensional piezoelectric actuator 41 has a first arm 41a, a second arm 41b, a third arm 41c and a fourth arm 41d which are formed by substantially 90 degrees (at right angle) with respect to the friction member 42. As can be seen from FIG. 9A, the first arm 41a and the third arm 41c are formed symmetrically with respect to the friction member 42 and have substantially herringbone shaped cross-section in a plane substantially perpendicular to a face 42a of the friction member 42 contacting the convex spherical surface 15 of the image pickup unit 10. Similarly, the second arm 41b and the fourth arm 41d are formed symmetrically with respect to the friction member 42 and have substantially herringbone shaped cross-section. The first to fourth arms 41a to 41d are respectively formed by repeatedly lamination of a first and a second partial electrodes 44a and 44b, a piezoelectric plate 43 and a common electrode 45 in a direction shown is perpendicular to the herringbone shaped cross-section.

A first voltage having sinusoidal waveform is applied between the first partial electrode 44a and the common electrode 45 in the first arm 41a. A third voltage having sinusoidal waveform with a phase difference from that of the first voltage is applied between the third partial electrode 44c and the common electrode 45 in the third arm 41c. The first and the third arms 41a and 41c repeat the following movement. In a first stage, the first arm 41a expands and the third arm 41c contracts. In a second stage, both of the first arm 41a and the third arm 41c expand. In a third stage, the first arm 41a contracts and the third arm 41c expands. In a fourth stage, both of the first arm 41a and the third arm 41c contract. As a result, the friction member 42 is moved for trailing an elliptical orbit in a plane including the first and the third arms 41a and 41c.

Similarly, a second voltage having sinusoidal waveform is applied between the second partial electrode 44b and the common electrode 45 in the second arm 41b, and a fourth voltage having sinusoidal waveform with a phase difference from that of the second voltage is applied between the fourth partial electrode 44d and the common electrode 45 in the fourth arm 41*d*. The second and the fourth arms 41*b* and 41*d* repeat the following movement. In a fifth stage, the second arm 41*b* expands and the fourth arm 41*d* contracts. In a sixth stage, both of the second arm 41*b* and the fourth arm 41*d* expand. In a seventh stage, the second arm 41*b* contracts and the fourth arm 41*d* expands. In a eighth stage, both of the second arm 41*b* and the fourth arm 41*d* contract. As a result, the friction member 42 is moved for trailing an elliptical orbit in a plane including the second and the fourth arms 41*b* and 41*d*.

These two elliptical movements of the friction member 42 are independently controlled, so that the friction member 42 can be moved to a desired two-dimensional direction. Following the elliptical movements of the friction member 42, the convex spherical surface 15 of the image pickup unit 10 is revolved in a desired direction.

Another configuration of the second embodiment is described with reference to FIG. 10. As can be seen from FIG. 10, front of the opening 23 of the housing 20 of the image pickup apparatus is sealed by a transparent member 28. The housing 20 and the transparent member 28 constitute a closed housing. Thus, the image pickup optical lens system 11 of the image pickup unit 10 is not necessarily sealed.

Third Embodiment

A third embodiment of an image pickup apparatus of this invention is described with reference to the drawings. In the third embodiment, a driving mechanism is provided in a image pickup unit which is a moving portion of the image pickup apparatus. Elements designated by the same numerals as those in the above-mentioned second embodiment are substantially the same, so that the explanation of the elements are omitted.

Figure 11:
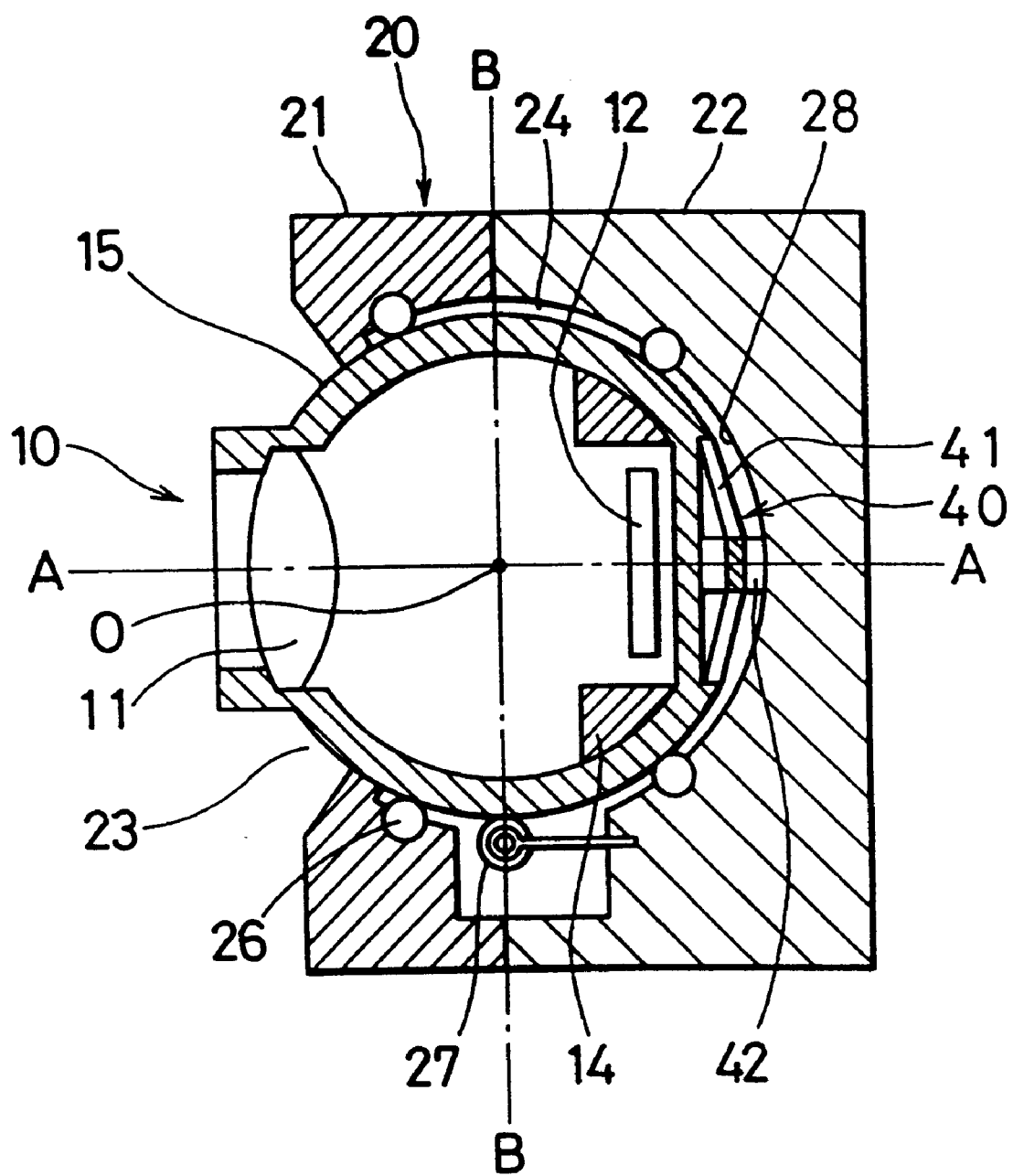
FIG. 11 is a cross-sectional view showing a configuration of a third embodiment of an image pickup apparatus of this invention.
Figure 12:
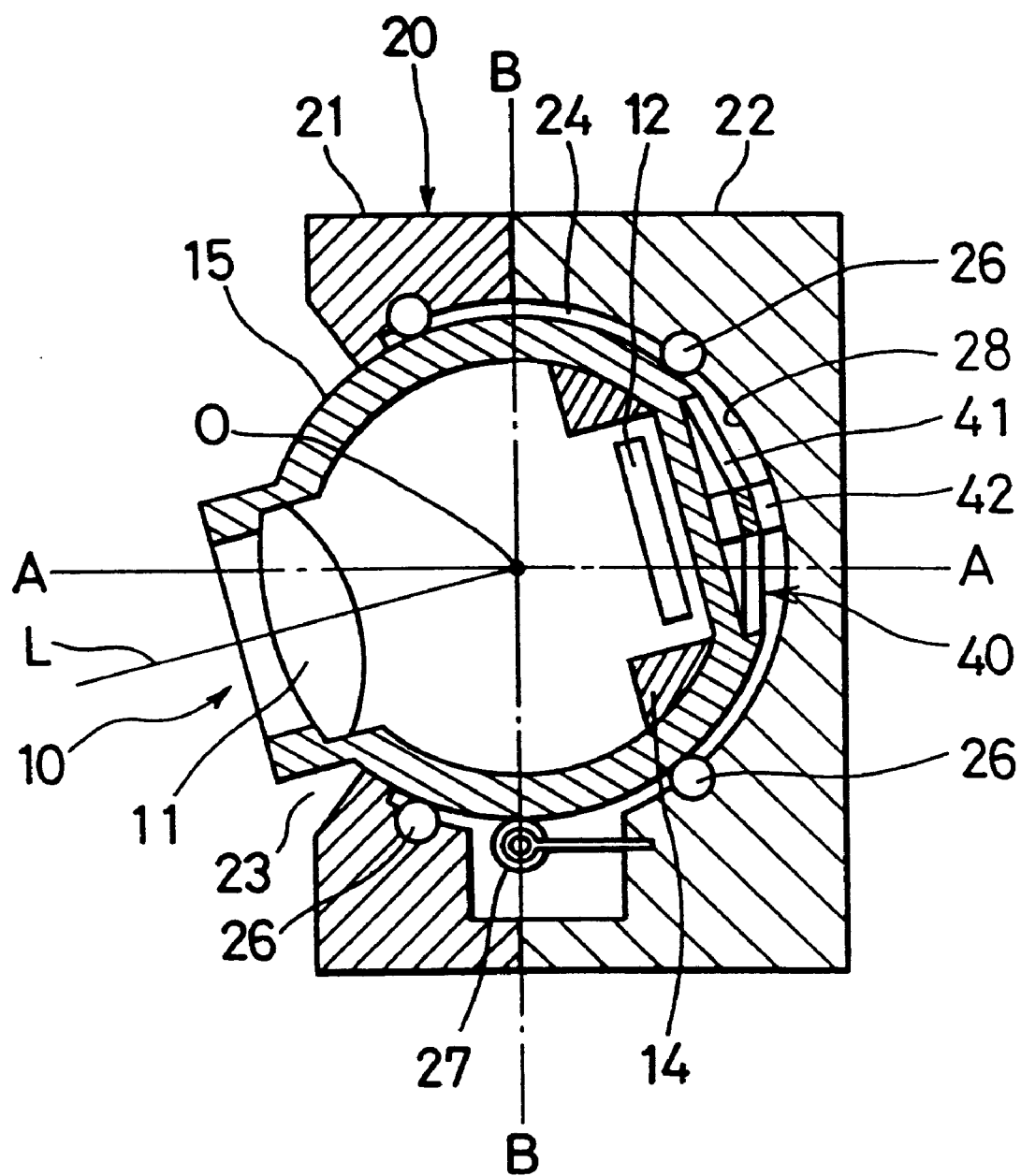
FIG. 12 is a cross-sectional view showing a moving condition of the third embodiment.

As can be seen from FIGS. 11 and 12, the driving mechanism 40 is provided on the image pickup unit 10. The driving mechanism 40 is disposed at a position symmetrical to the image pickup optical lens system 11 with respect to the center O of the sphere constituting a convex spherical surface 15 of the image pickup unit 10. The driving mechanism 40 is substantially the same as that in the second embodiment shown in FIGS. 9A and 9B.

Figure 13A:
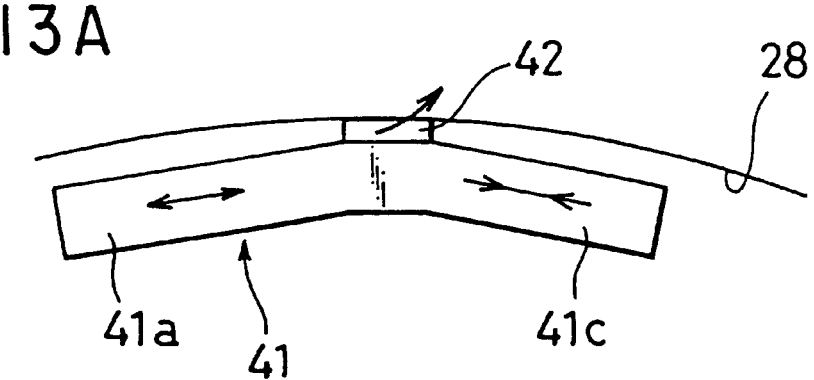
FIGS. 13A to 13D are side views schematically showing series of movement of the driving device in the third embodiment.
Figure 13B:
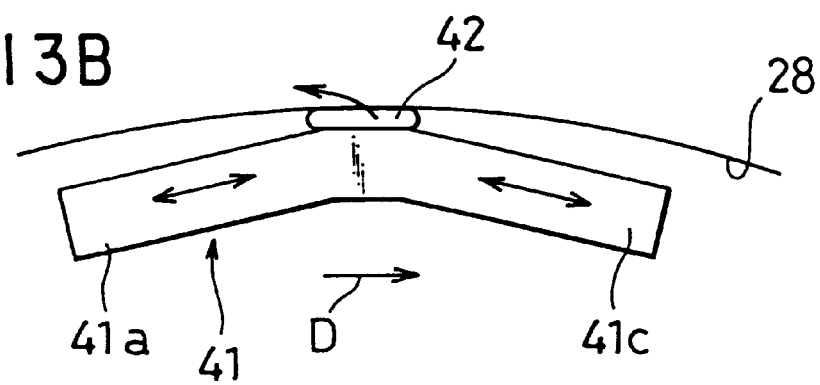
Figure 13C:
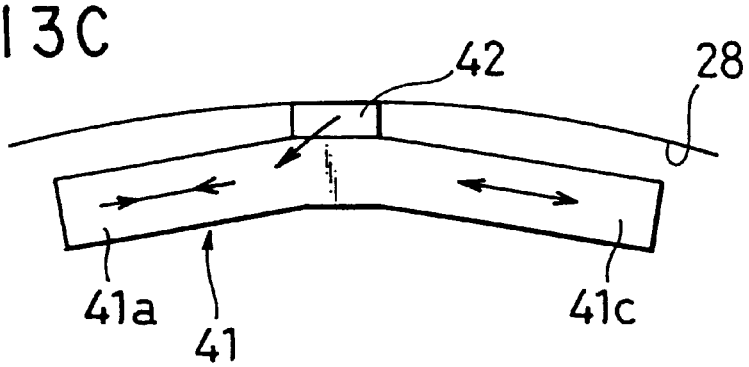
Figure 13D:
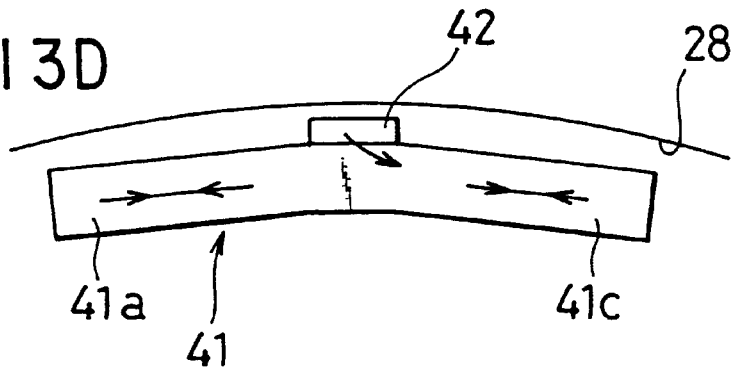

Voltages W1 and W2 having sinusoidal waveform with phase difference shown in FIG. 5 are respectively applied to the first arm 41*a* and the third arm 41*c* of the two-dimensional piezoelectric actuator 41. In a first stage shown in FIG. 13A, the first arm 41*a* expands and the third arm 41*c* contracts at a time t1 shown in FIG. 5. In a second stage shown in FIG. 13B, both of the first arm 41*a* and the third arm 41*c* expand at a time t2. In a third stage shown in FIG. 13C, the first arm 41*a* contracts and the third arm 41*c* expands at a time t3. In a fourth stage shown in FIG. 13D, both of the first arm 41*a* and the third arm 41*c* contract at a time t4. As a result, the friction member 42 is moved for trailing an elliptical orbit. Since the concave spherical surface 28 of the space 24 of the housing 20 is immovable. Thus, the image pickup unit 10 relatively revolves in a direction shown by arrow D in FIG. 13B.

Similarly, two voltages having sinusoidal waveform with phase difference are respectively applied to the second arm 41*b* and the fourth arm 41*d* of the two-dimensional piezoelectric actuator 41. The second and the fourth arms 41*b* and 41*d* repeat the following movement. In a fifth stage, the second arm 41*b* expands and the fourth arm 41*d* contracts. In a sixth stage, both of the second arm 41*b* and the fourth arm 41*d* expand. In a seventh stage, the second arm 41*b* contracts and the fourth arm 41*d* expands. In a eighth stage, both of the second arm 41*b* and the fourth arm 41*d* contract. As a result, the friction member 42 is moved for trailing an elliptical orbit in a plane including the second and the fourth arms 41*b* and 41*d*.

These two elliptical movements of the friction member 42 are independently controlled, so that the friction member 42 can be moved to a desired two-dimensional direction. Following the elliptical movements of the friction member 42, the image pickup unit 10 is revolved in a desired direction.

Figure 22:
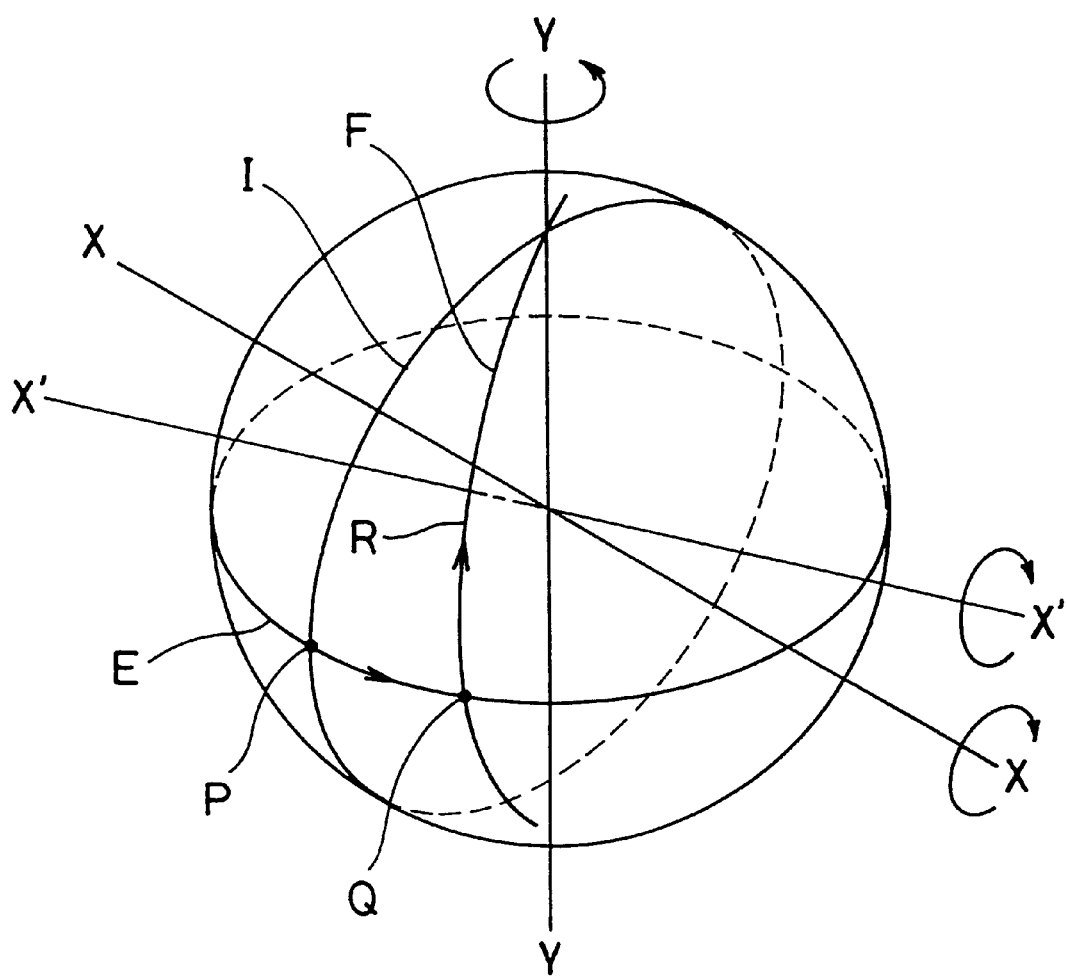
FIG. 22 is a perspective view schematically showing a movement of the image pickup apparatus in the third and the fifth embodiment.

In the third embodiment, the driving mechanism 40 including the two-dimensional piezoelectric actuator 41 is provided in the image pickup unit 10. Furthermore, the convex spherical surface 15 of the image pickup unit 10 and the concave spherical surface 28 of the housing 20 configure a spherical bearing, When the two-dimensional piezoelectric actuator 41 is driven, the image pickup unit 10 revolves around a desired axis passing the center O of the sphere constituting the convex spherical surface 15. Hereupon, FIG. 22 is referred. In FIG. 22, a sphere is regarded as image pickup unit 10. When the image pickup unit 10 revolves around a Y-Y axis for moving a peak on the optical axis of the image pickup optical lens system 11 of the image pickup unit 10 from a point P to a point Q along the equator E, an X-X axis revolves to an X'-X' axis. The point Q is a cross point of a longitude F passing a point R and an equator E. Furthermore, when the image pickup unit 10 revolves around the X'-X' axis, the peak on the optical axis of the image pickup optical lens system 11 moves along the longitude F. Thus, the peak on the optical axis of the image pickup optical lens system 11 directly reaches to the point R which is the object point. The peak on the optical axis of the image pickup optical lens system 11 always moves along any longitude, so that a longitudinal direction and a lateral direction of the image pickup device 12 coincide with those of the object. The image obtained by this image pickup apparatus never inclines.

Another configuration of the third embodiment is described with reference to FIG. 14. As can be seen from FIG. 14, front of the opening 23 of the housing 20 of the image pickup apparatus is sealed by a transparent member 28. The housing 20 and the transparent member 28 constitute a closed housing. Thus, the image pickup optical lens system 11 of the image pickup unit 10 is not necessarily sealed.

Figure 15:
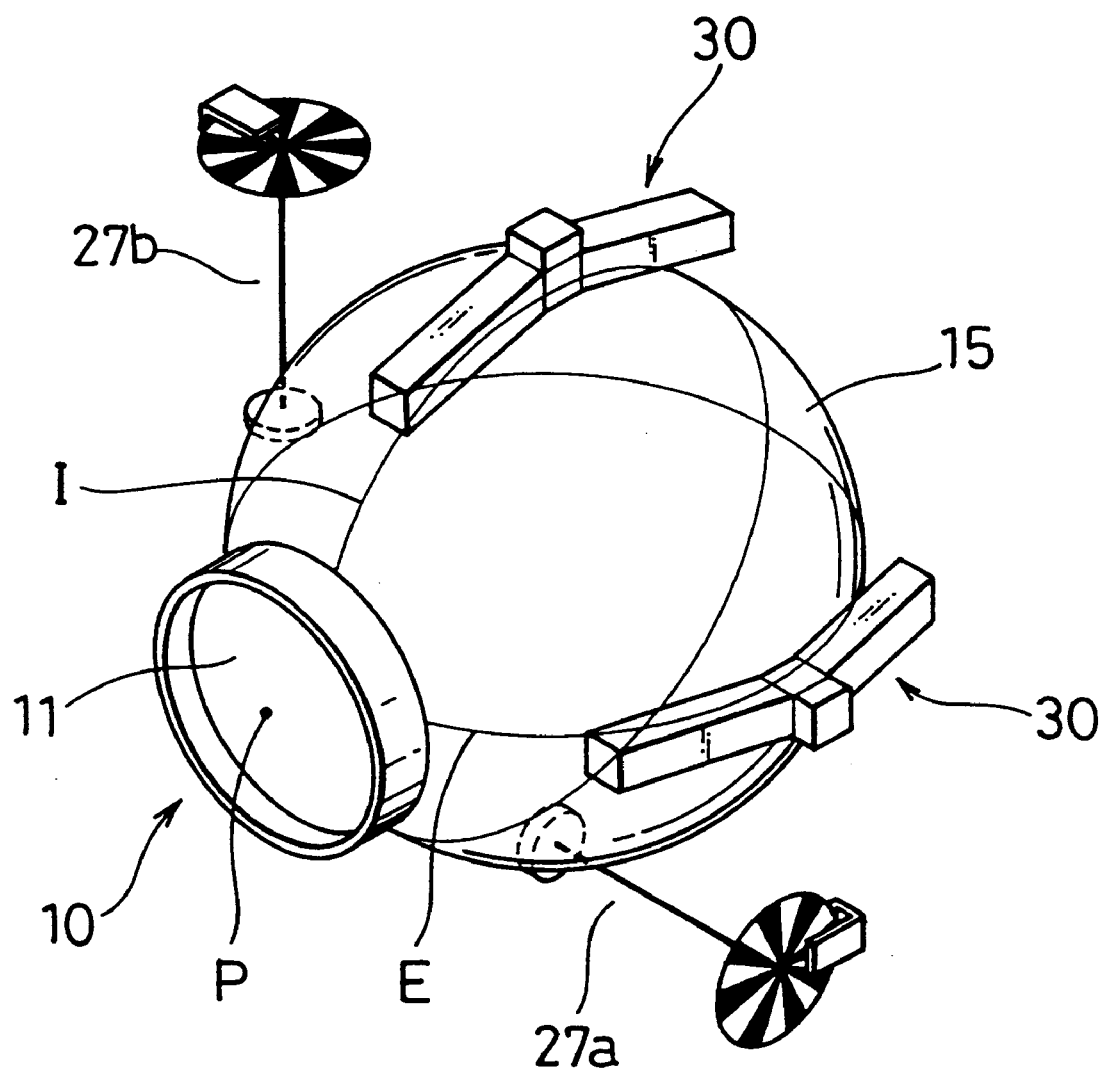
FIG. 15 is a perspective view showing still another configuration of the third embodiment.

Still another configuration of the third embodiment is described with reference to FIG. 15. As can be seen from FIG. 15, two sets of driving mechanisms 30 including the one-dimensional piezoelectric actuator 31 are provided on the image pickup unit 10. The driving mechanisms 30 are substantially the same as that in the first embodiment shown in FIGS. 4A and 4B.

Fourth Embodiment

A fourth embodiment of an image pickup apparatus of this invention is described with reference to the drawings. Elements designated by the same numerals as those in the above-mentioned first to third embodiments are substantially the same, so that the explanation of the elements are omitted.

As can be seen from FIGS. 16 and 17, a portion of the convex spherical surface 15 of the image pickup unit 10 is made of a transparent glass material (hereinafter, which is called glass portion 17). Specifically, a portion of the convex spherical wall of a body of the image pickup unit 10 is cut off, and a transparent glass lens (plano-convex lens) having a spherical surface substantially the same curvature is fixedly engaged with the cutting portion.

Further to the image pickup optical lens system 11 and the image pickup device 12, a two-dimensional light receiving device 13 is provided in the image pickup unit 10. The image pickup optical lens system 11, the image pickup device 12, the two-dimensional light receiving device 13 and the glass portion 17 are arranged on the optical axis L of the image pickup optical lens system 11. In FIG. 16 showing an initial condition of the image pickup apparatus, the optical axis 1 coincides with the axis A-A.

The recess 25, in which a driving mechanism 60 and a light emitting device 16 are provided, is formed on the concave spherical surface 28 in a second portion 22 of the housing 20. A contacting portion 61 of the driving mechanism 60 which contacts the glass portion 17 of the image pickup unit 10 and the light emitting device 16 are arranged on the axis A-A. The control unit 50 is, for example, provided in the housing 20. The position of the control unit 50 is not restricted by the illustration.

A light receiving surface of the two-dimensional light receiving device 13 faces the glass portion 17. Thus, a light beam emitted from the light emitting device 16 passes through an opening 62 formed on the contacting portion 61 of the driving mechanism 60 and the glass portion 17 and reaches to the light receiving surface of the two-dimensional light receiving device 13. Since one surface of the glass portion 17 is convex spherical, so that the glass portion 17 serves as a collective lens. Thus, the light beam emitted from the light emitting device 16 is converged by the glass portion 17. A diameter of the beam spot on the light receiving surface of the two-dimensional light receiving device 13 is sufficiently small.

Figure 18A:
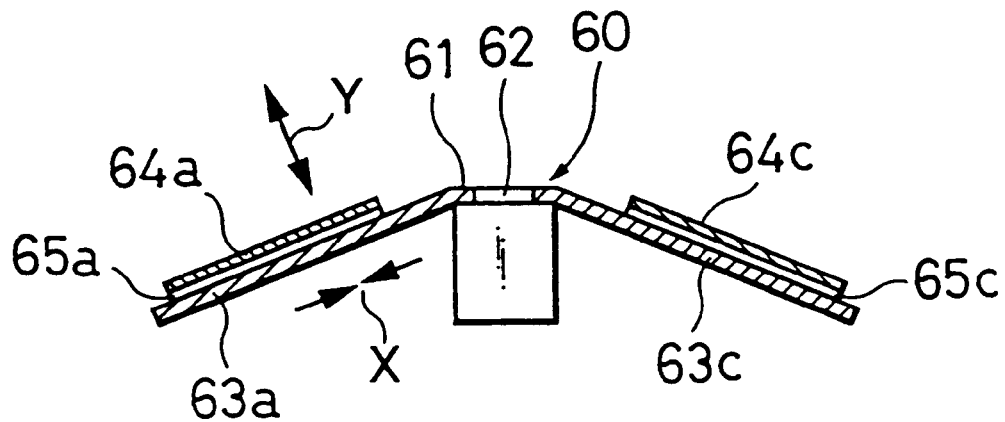
FIG. 18A is a front view showing a configuration of a driving device in the fourth embodiment.
Figure 18B:
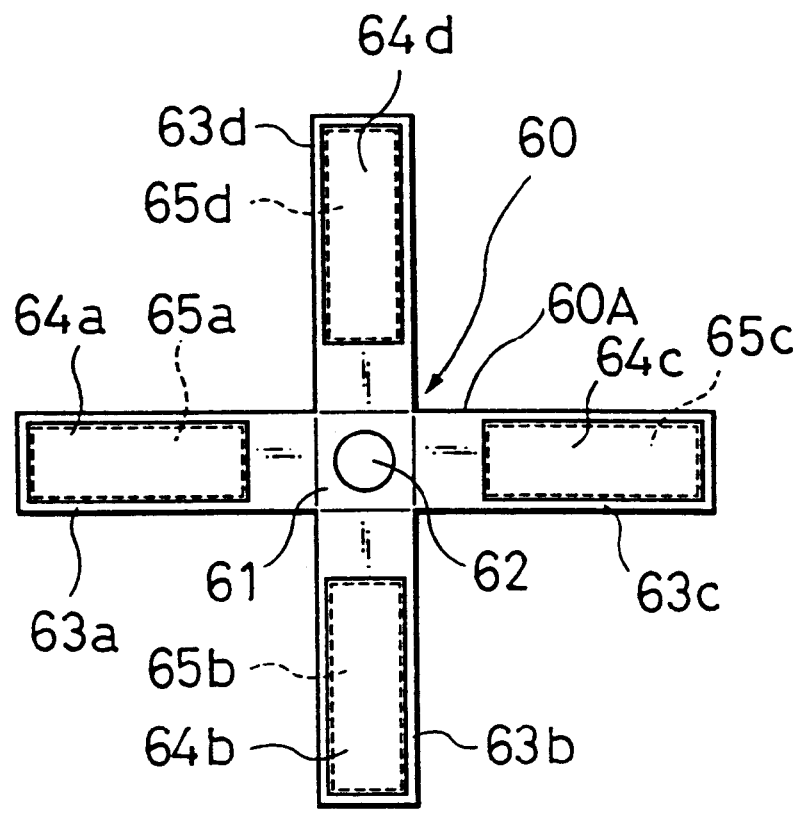
FIG. 18B is a plan view of the driving device in the fourth embodiment.

A configuration of the driving mechanism 60 is described with reference to FIGS. 18A and 18B. As can be seen from FIG. 18B, the driving mechanism 60 comprises a base member 30A having a first arm 63a, a second arm 63b, a third arm 63c and a fourth arm 63d which are formed by substantially 90 degrees (at right angle) with respect to the contacting portion 61. A first to a fourth partial electrodes 64a to 64d and a first to a fourth piezoelectric plate 65a to 65d are respectively piled up on the first to the fourth arms 63a to 63d. The opening 62 is formed at the center of the contacting portion 61. The base member 60A serves as not only a common electrode of the two-dimensional piezoelectric actuator, but also an elastic member for absorbing the wobble by pressing the image pickup unit 10 to the balls 26. Thus, as can be seen from FIG. 18A, the first arm 63a and the third arm 63c are formed symmetrically with respect to the contacting portion 61 and have substantially herringbone shaped cross-section in a plane substantially perpendicular to a contacting face of the contacting portion 61. Similarly, the second arm 63b and the fourth arm 63d are formed symmetrically with respect to the contacting portion 61 and have substantially herringbone shaped cross-section.

A voltage W1 having sinusoidal waveform shown in FIG. 5 is applied between the base member 30A serving as the common electrode and the first partial electrode 64a. At the same time, a voltage W2 having sinusoidal waveform shown in FIG. 5 is applied between the base member 30A serving as the common electrode and the third partial electrode 64c. when the piezoelectric plate (for example, 65a) expands in a direction shown by arrow Y which is parallel to the direction of the electric field, the piezoelectric plate contracts in a direction shown by arrow x which is perpendicular to the direction of the electric field. The driving mechanism 60 utilize such phenomena for two-dimensionally moving the image pickup unit 10.

At a time t1 in FIG. 5, the first arm 63a contracts and the third arm 63c expands. At a time t2, both of the first and the third arms 63a and 63c expand. At a time t3, the first arm 63c expands and the third arm 63c contracts, At a time t4, both of the first and the third arms 63a and 63c contract. As a result, the contacting portion 61 is moved for trailing a elliptical orbit. Following the motion of the contacting portion 61 of the driving mechanism 60, the image pickup unit 10 revolves around an optional axis passing the center O of the sphere constituting the convex spherical surface 15.

Similarly, the above-mentioned motion of the arms are applicable to the second arms 63b and the fourth arm 63d. These two elliptical movements of the contacting portion 61 are independently controlled, so that the contacting portion 61 can be moved to a desired two-dimensional direction. Following the elliptical movements of the contacting portion 61, the convex spherical surface 15 of the image pickup unit 10 is revolved in a desired direction. When the image pickup unit 10 is moved in an opposite direction, the phase difference between the sinusoidal waveforms of the voltages W1 and W2 should be reversed.

Figure 19:
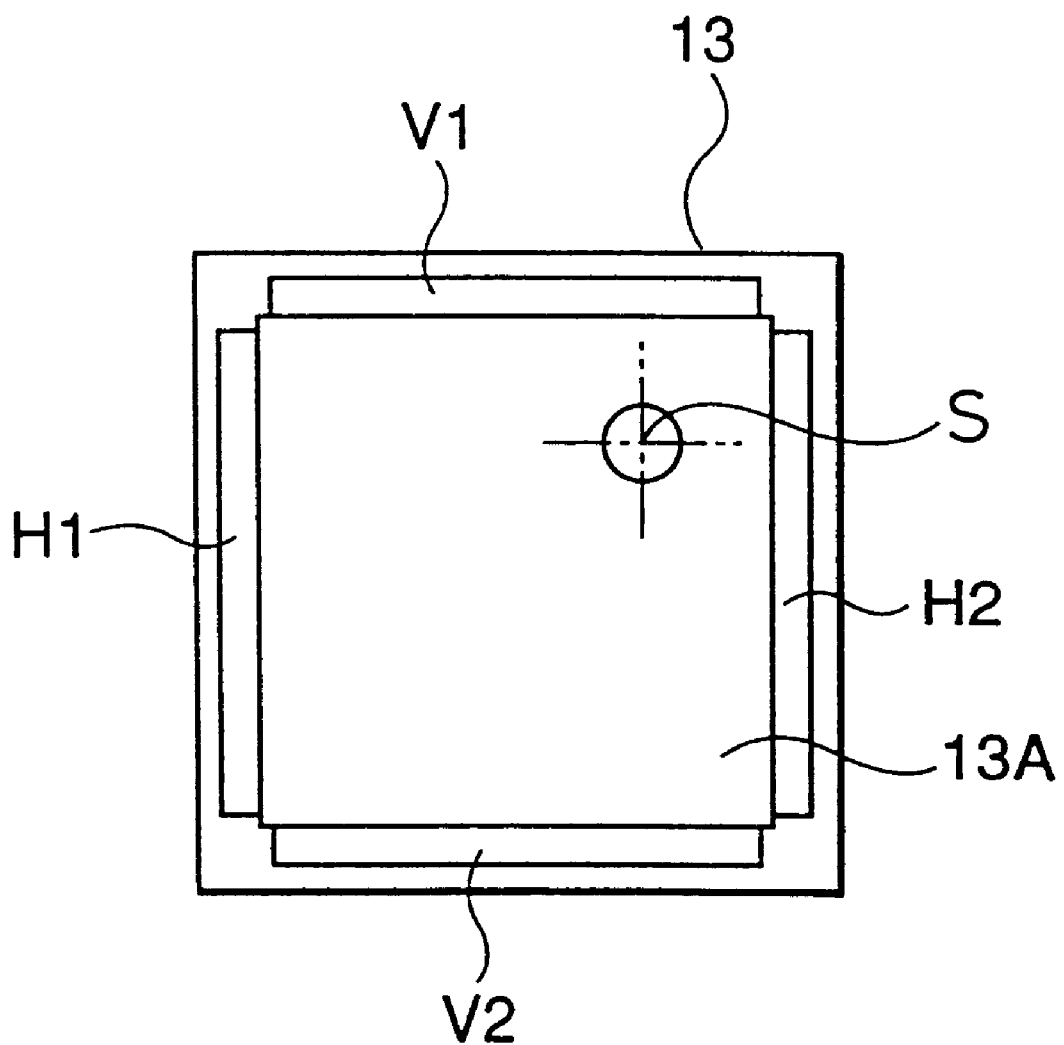
FIG. 19 is a front view showing a configuration of a two-dimensional light receiving device used in the fourth embodiment.

FIG. 19 shows a configuration of the two-dimensional light receiving device 13. A regular square light receiving surface 13A is disposed at the center of the two-dimensional light receiving device 13. Four electrodes H1, H2, V1 and V2 are respectively disposed along four sides of the light receiving surface 13A. When a light beam emitted from the light emitting device 16 and converged by the glass portion 17 enters into the light receiving surface 13A as a beam spot S, output signals (photocurrents) from respective electrodes H1, H2, V1 and V2 vary corresponding to the distances of the electrodes from the beam spot S. By processing the output signals, the position of the beam spot S on the coordinates or the revolution angle of the image pickup unit 10 can be obtained. By such a configuration, the position or revolution angle of the image pickup unit 10 can directly be sensed.

Figure 20:
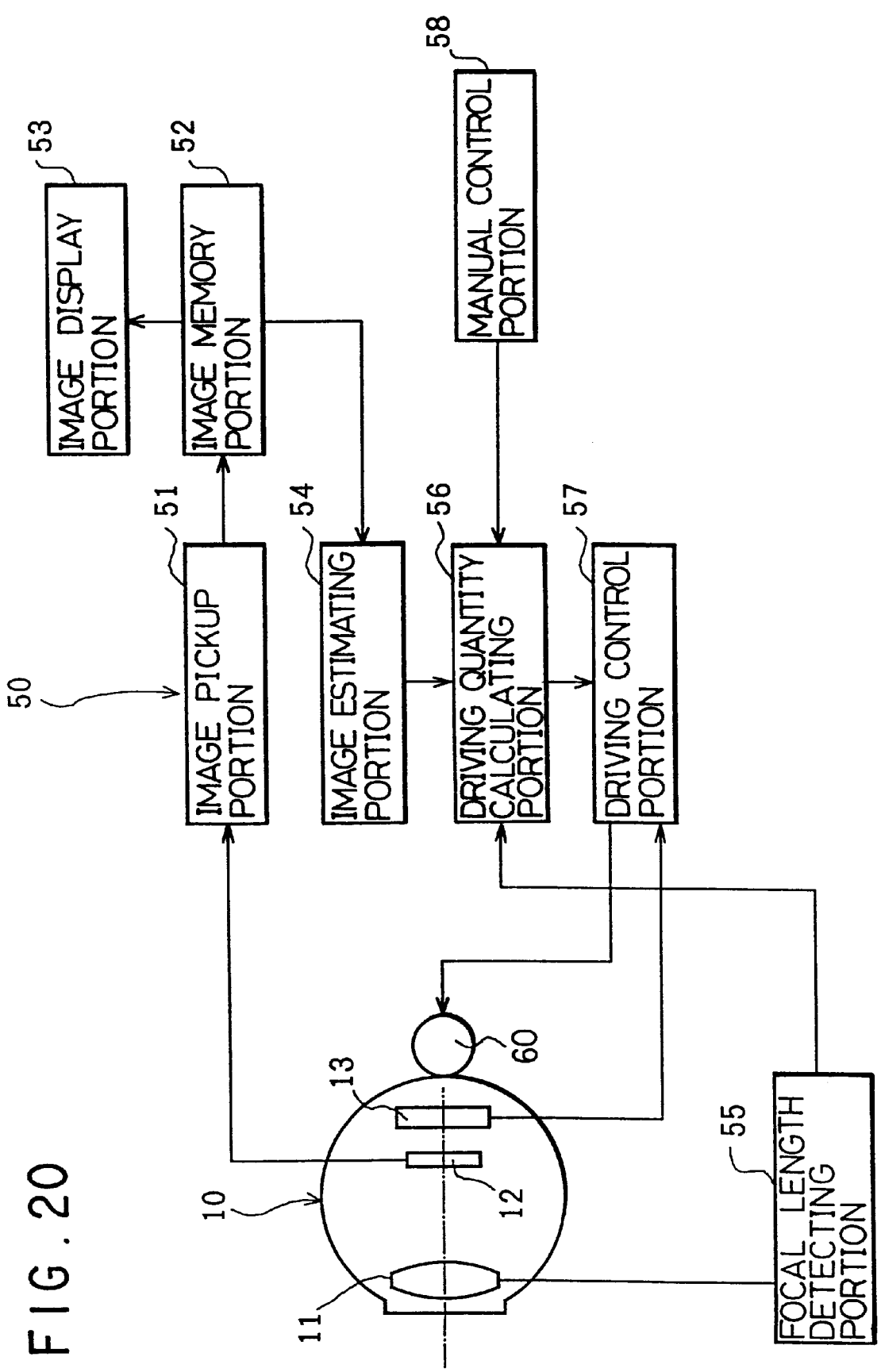
FIG. 20 is a block diagram showing a configuration of a control unit in the fourth embodiment.

A configuration of the block diagram of the control unit 50 in the fourth embodiment is shown in FIG. 20. In comparison with FIG. 20 and FIG. 7 in the first embodiment, the two-dimensional light receiving device 13 serves as the encoders 27a and 27b in the first embodiment. Since no indirect position detector such as a mechanical encoder is used, the error in the position sensing can be reduced, and the image pickup apparatus including the position sensor constituted by the two-dimensional light receiving device 13, the light emitting device 16 and the glass portion 17 can be downsized.

Fifth Embodiment

A fifth embodiment of an image pickup apparatus of this invention is described with reference to FIG. 21. Elements designated by the same numerals as those in the above-mentioned first to fourth embodiments are substantially the same, so that the explanation of the elements are omitted. The fifth embodiment includes the features of the above-mentioned third embodiment and the fourth embodiment.

Figure 21:
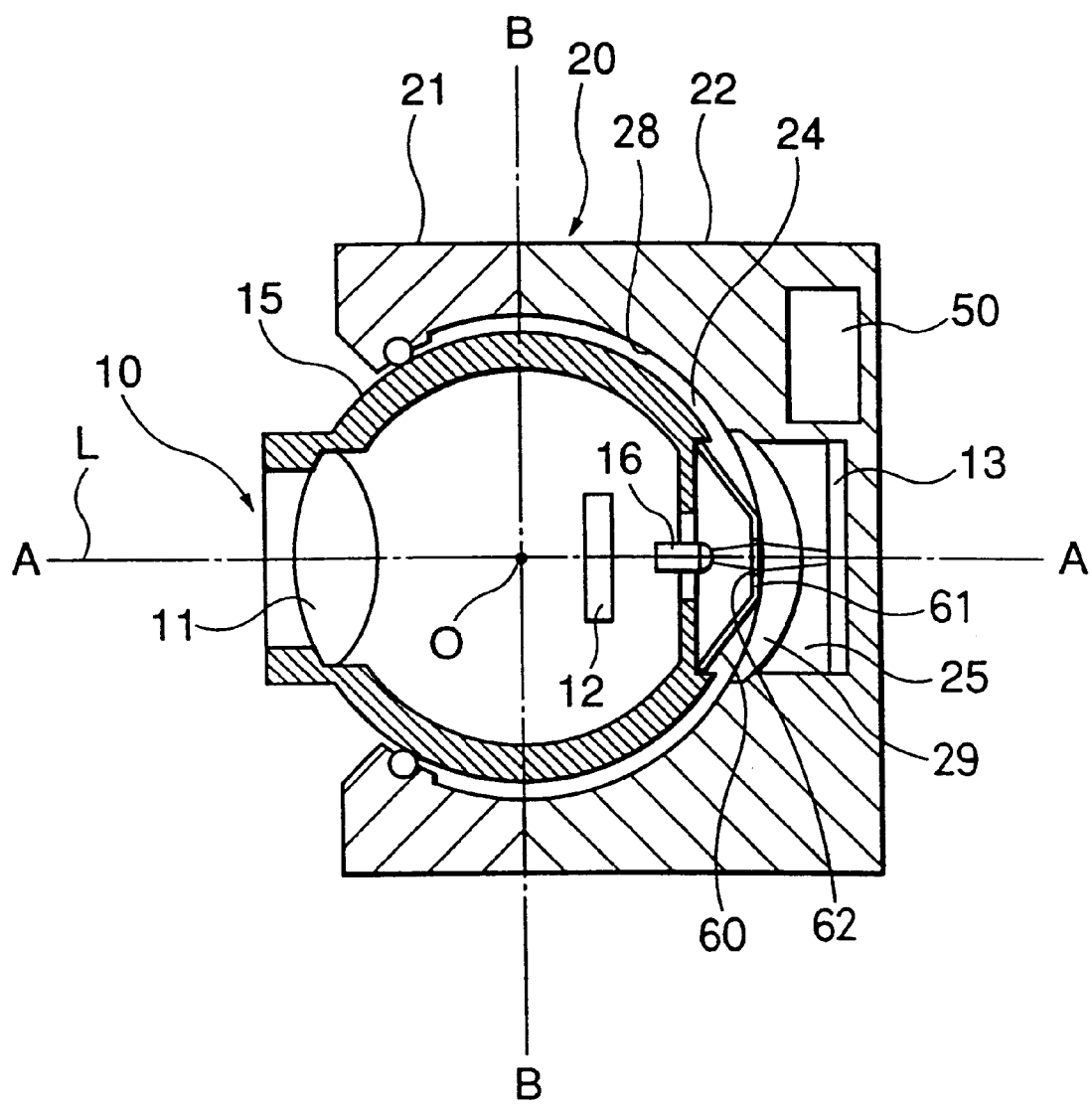
FIG. 21 is a cross-sectional view showing a configuration of a fifth embodiment.

As can be seen from FIG. 21, the light emitting device 16 and the driving mechanism 60 are provided on the image pickup unit 10, and the two-dimensional light receiving device 13 is provided in the recess 25 of the housing 20. A portion of the concave spherical surface 28 of the space 24 of the housing 20 is made of a transparent glass material (hereinafter, which is called glass portion 29). Specifically, a transparent glass portion having a spherical surface substantially the same curvature as the concave spherical surface 28 is fixedly engaged with the recess 25. As mentioned above, it is necessary that the lens portion 29 has a collective lens performance. Thus, the glass portion 29 is substantially convex-concave meniscus lens.

Sixth Embodiment

A sixth embodiment of a driving apparatus of this invention is described with reference to FIG. 16 or FIG. 21. The driving apparatus is suitable for the above-mentioned fourth or fifth embodiment of the image pickup apparatus.

Figure 16:
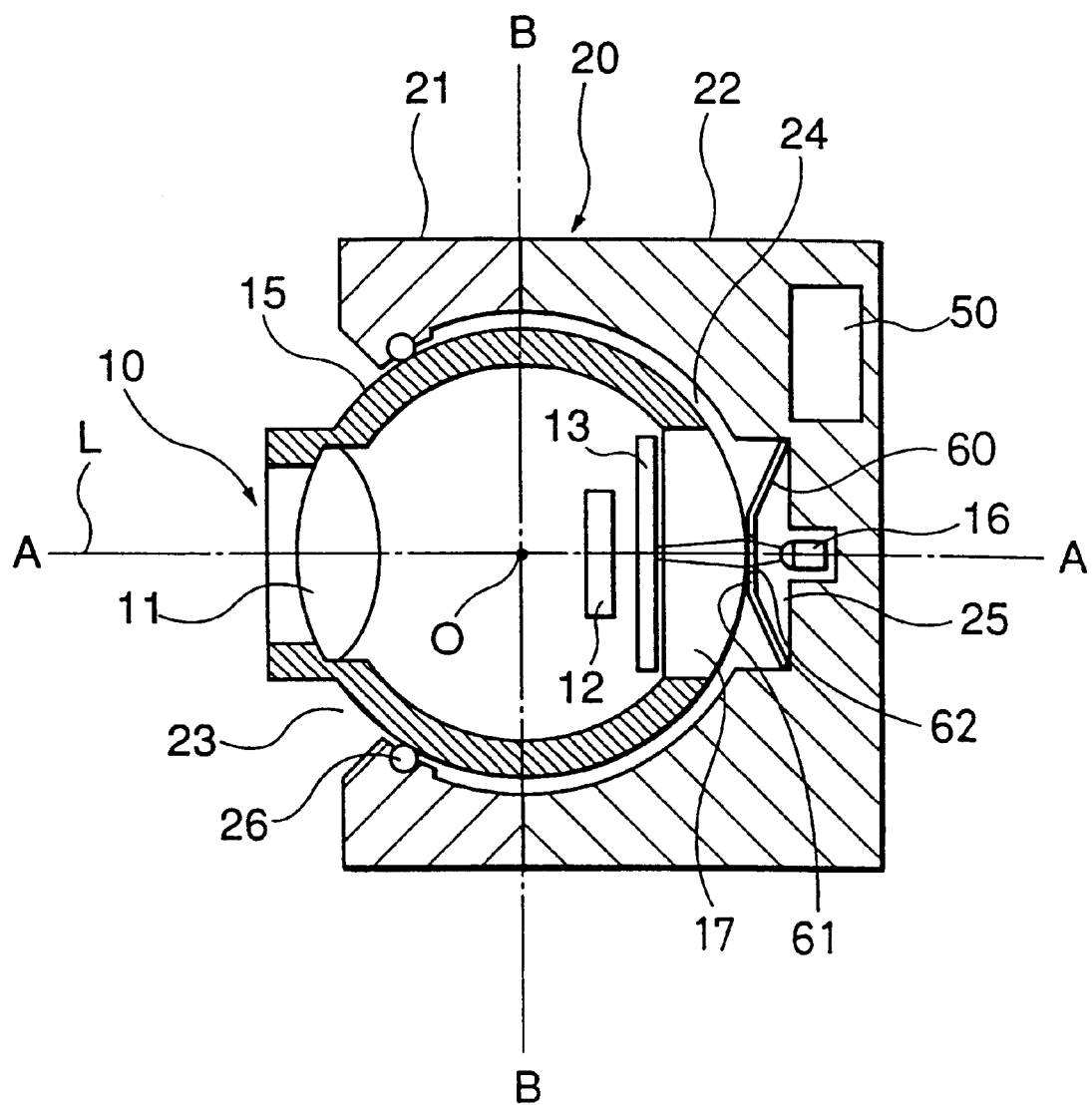
FIG. 16 is a cross-sectional view showing a configuration of a fourth embodiment of an image pickup apparatus of this invention.
Figure 17:
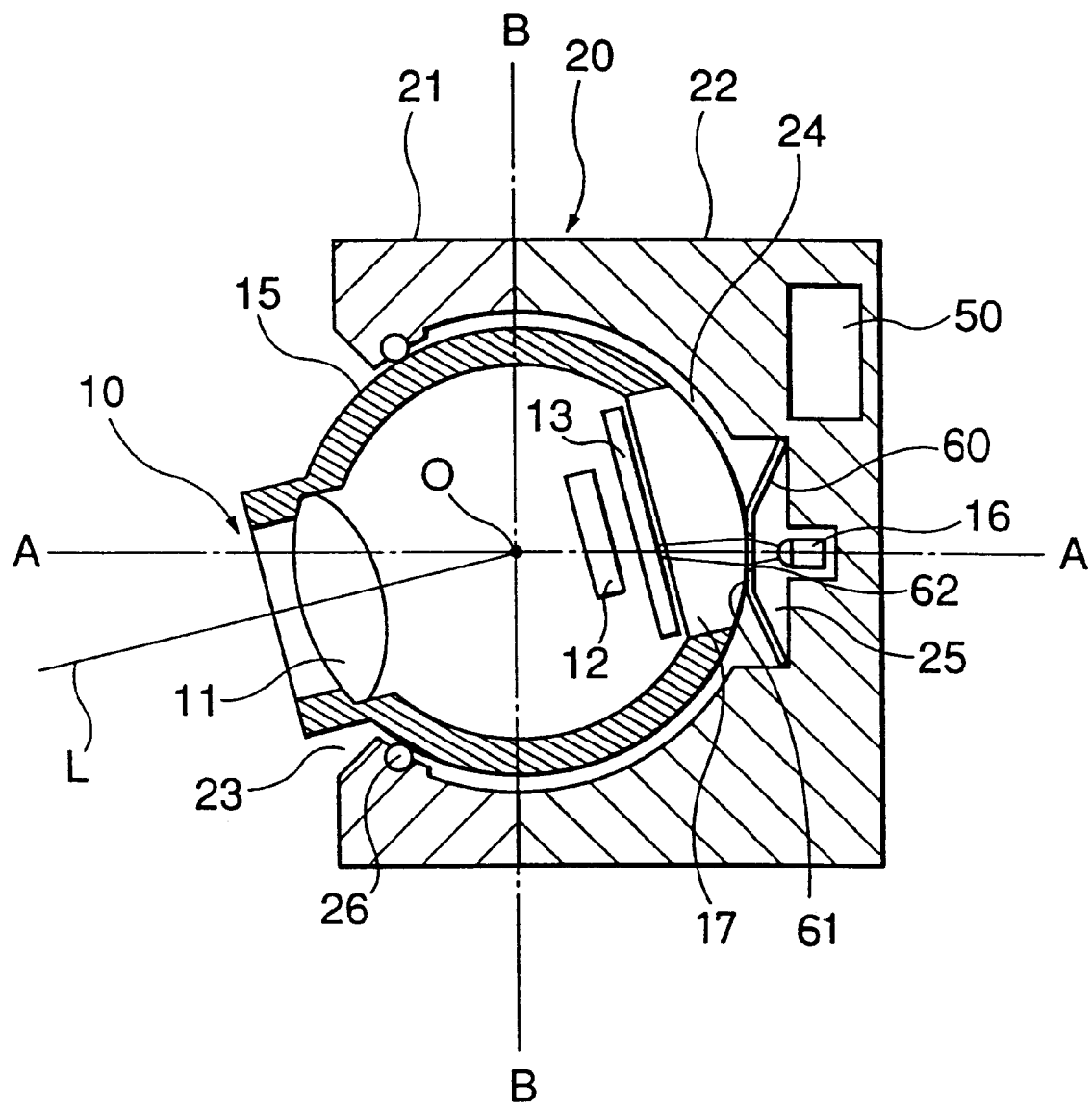
FIG. 17 is a cross-sectional view showing a moving condition of the fourth embodiment.

In case of FIG. 16, the driving device comprises a first member which is, for example, a ball shaped body of the image pickup unit 10, in which a portion 17 of an outer surface 15 is made of a glass, an actuator such as the driving mechanism 60 for moving the first member by pressing the glass portion 17 of the first member 10 and a second member which is, for example, the housing 20 for holding the actuator. When the first member 10 is relatively moved by the actuator 60 with respect to the second member 20, driven elements such as the image pickup optical lens system 11, the image pickup device 12 and so on, can be moved. In case of FIG. 21, the first member is, for example, the housing 20, and the second member is, for example, the body of the image pickup unit 10.

Generally, a glass material is easily mirror-finished by conventional lens manufacturing method. Furthermore, a material having a high surface hardness can be selected. Thus, the glass is suitable as a material of the glass portion of the first member where the actuator contacts, wear resistance of the first member increases. When the surface of the glass is mirror-finished, minute vibrations of the piezoelectric actuator can effectively be utilized as a driving force. As a result, the driving apparatus, which can move the driven elements by a minute displacement and has a high durability, is obtained.

Since the glass portion of the first member has transparency, and two elements such as light emitting device 16 and a light receiving device 13 which constitute an optical position sensor can be provided at both sides of the glass portion 17 or 29. By such a configuration, the position or revolution angle of the body of the image pickup unit 10 can directly be sensed. Since no indirect position detector such as a mechanical encoder is used, the error in the position sensing can be reduced, and the apparatus including the position sensor can be downsized.

Seventh Embodiment

Figure 23:
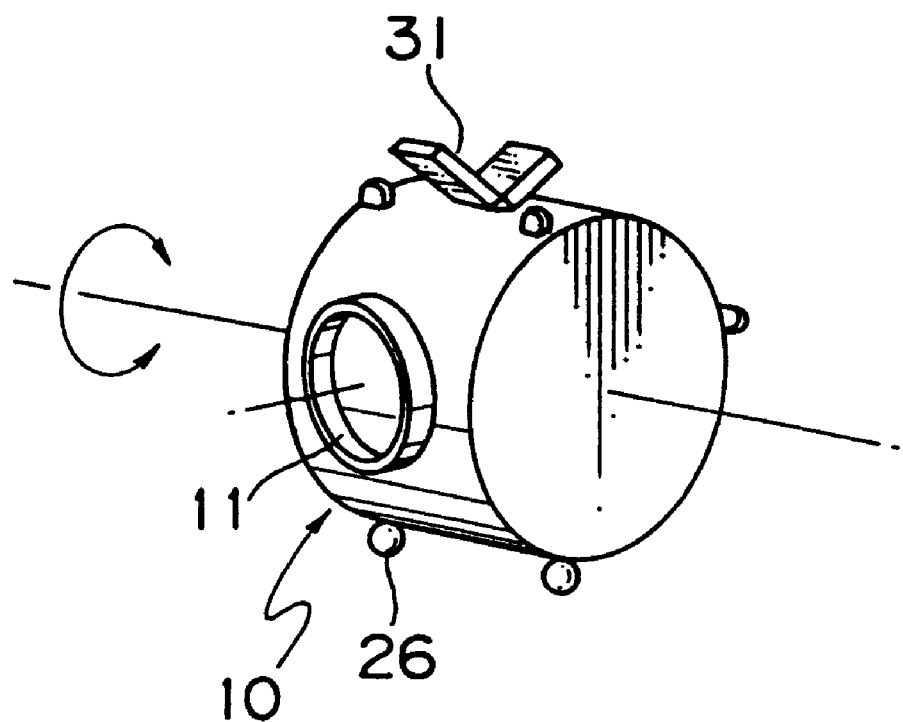
FIG. 23 is a perspective view showing a configuration of a seventh embodiment.
Figure 24:
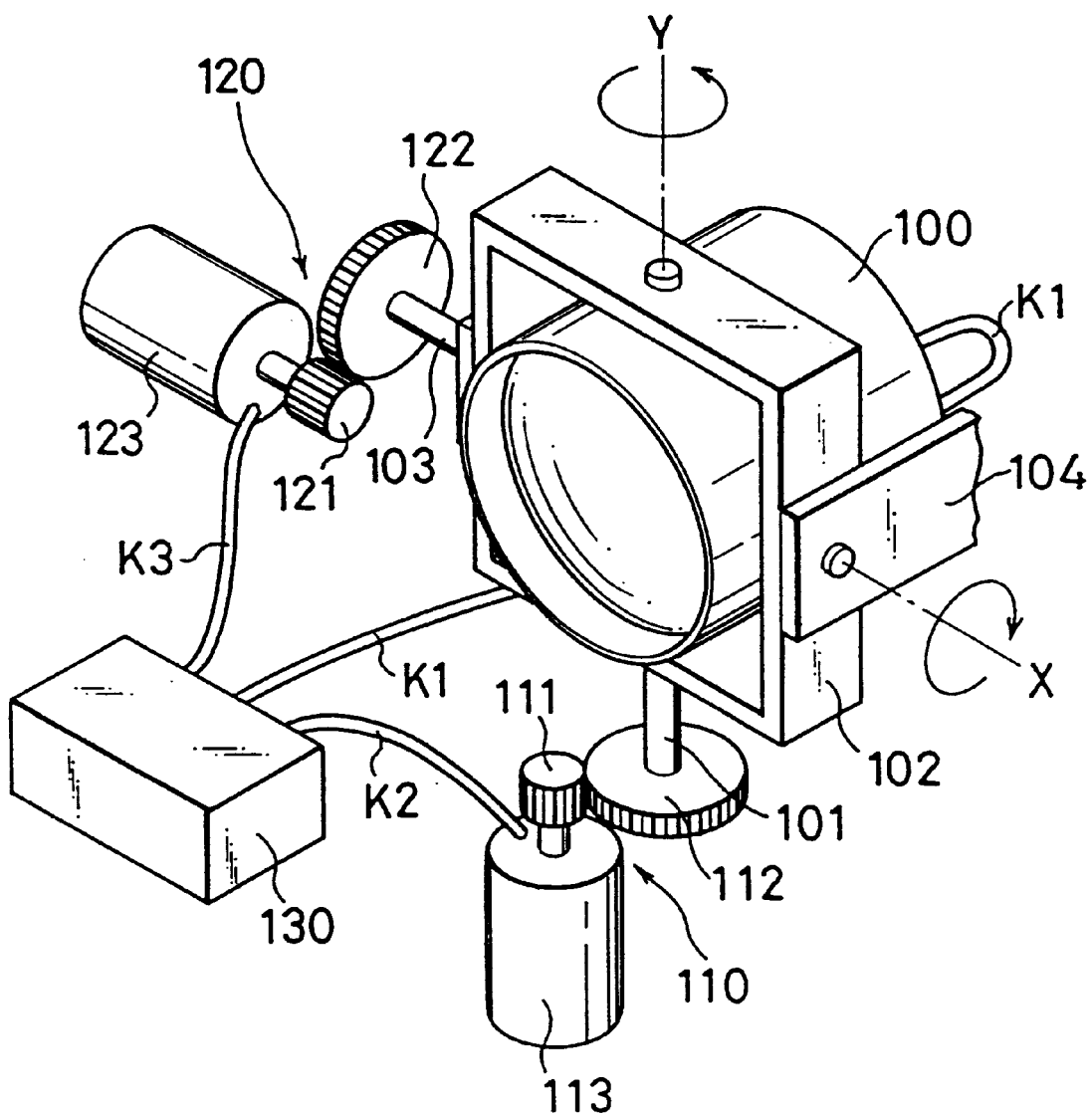
FIG. 24 is a perspective view showing the conventional image pickup apparatus.

A seventh embodiment of an image pickup apparatus of this invention is described with reference to FIG. 23. Elements designated by the same numerals as those in the above-mentioned first to fifth embodiments are substantially the same, so that the explanation of the elements are omitted. In the above-mentioned first to fifth embodiments, the image pickup unit 10 has substantially a ball shape and it is revolved around two axes. However, the image pickup unit 10 of the seventh embodiment has substantially a cylindrical shape and it is revolved around one axis. That is, the image pickup unit 10 has no convex spherical surface. A configuration of the image pickup apparatus of the seventh embodiment is substantially the same as that of the first embodiment shown in FIG. 1. Seventh embodiment is suitable for chasing an objective which one-dimensionally moves on a line.

Other Modifications

When the above-mentioned embodiments of the image pickup apparatus of this invention is used in a dusty environment, a humid environment, a wettish environment, and so on, it is preferable that a seal member such as O-ring be provided between the opening 23 of the housing 20 and the convex spherical surface 15 of the image pickup unit 10. By such a configuration, dust-proof, humidity-proof or waterproof image pickup unit can be obtained without any special housing. Of course, the image pickup optical lens system 11 of the image pickup unit 10 is sealed.

Figure 10:
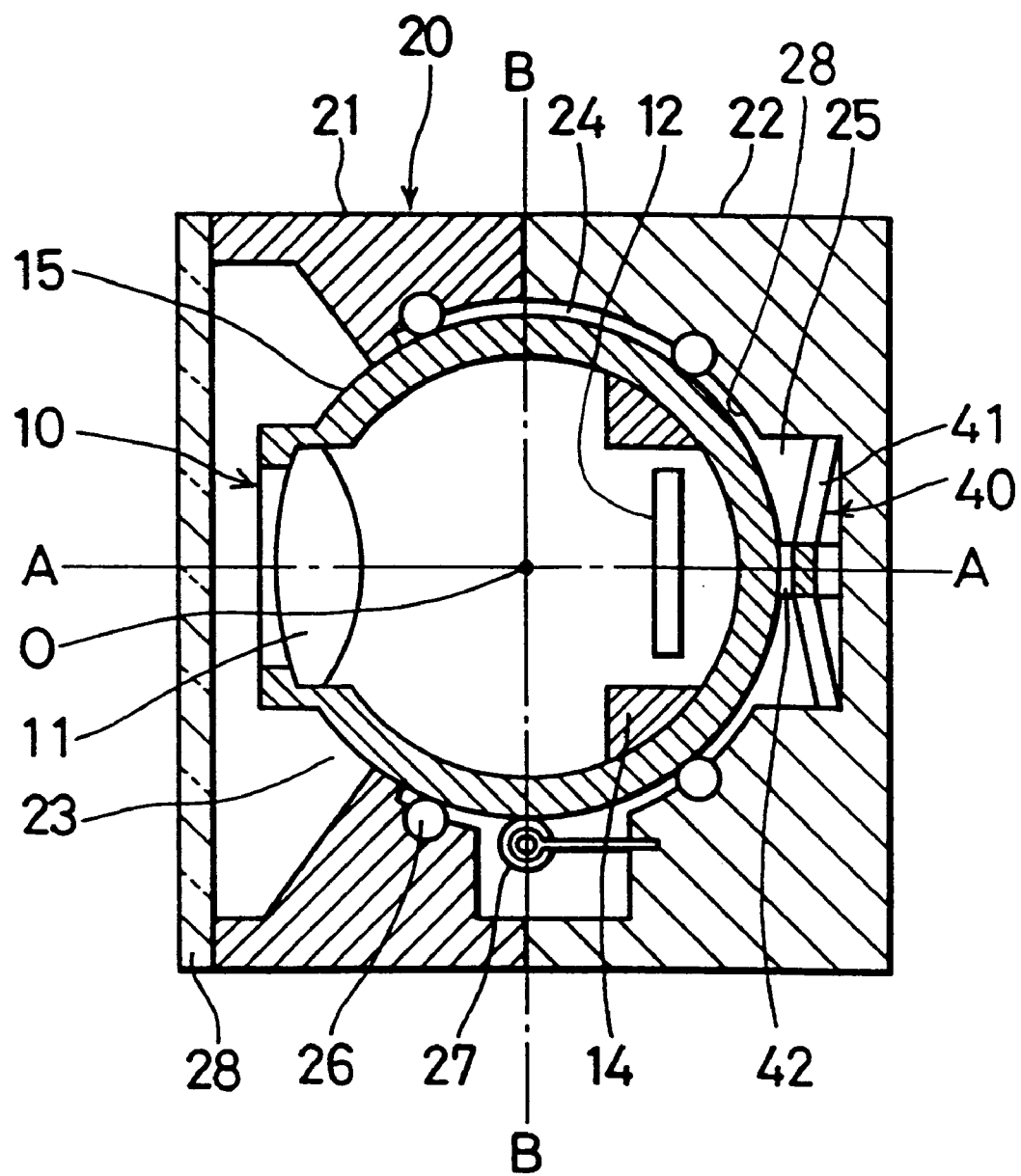
FIG. 10 is a cross-sectional view showing another configuration of the second embodiment.
Figure 14:
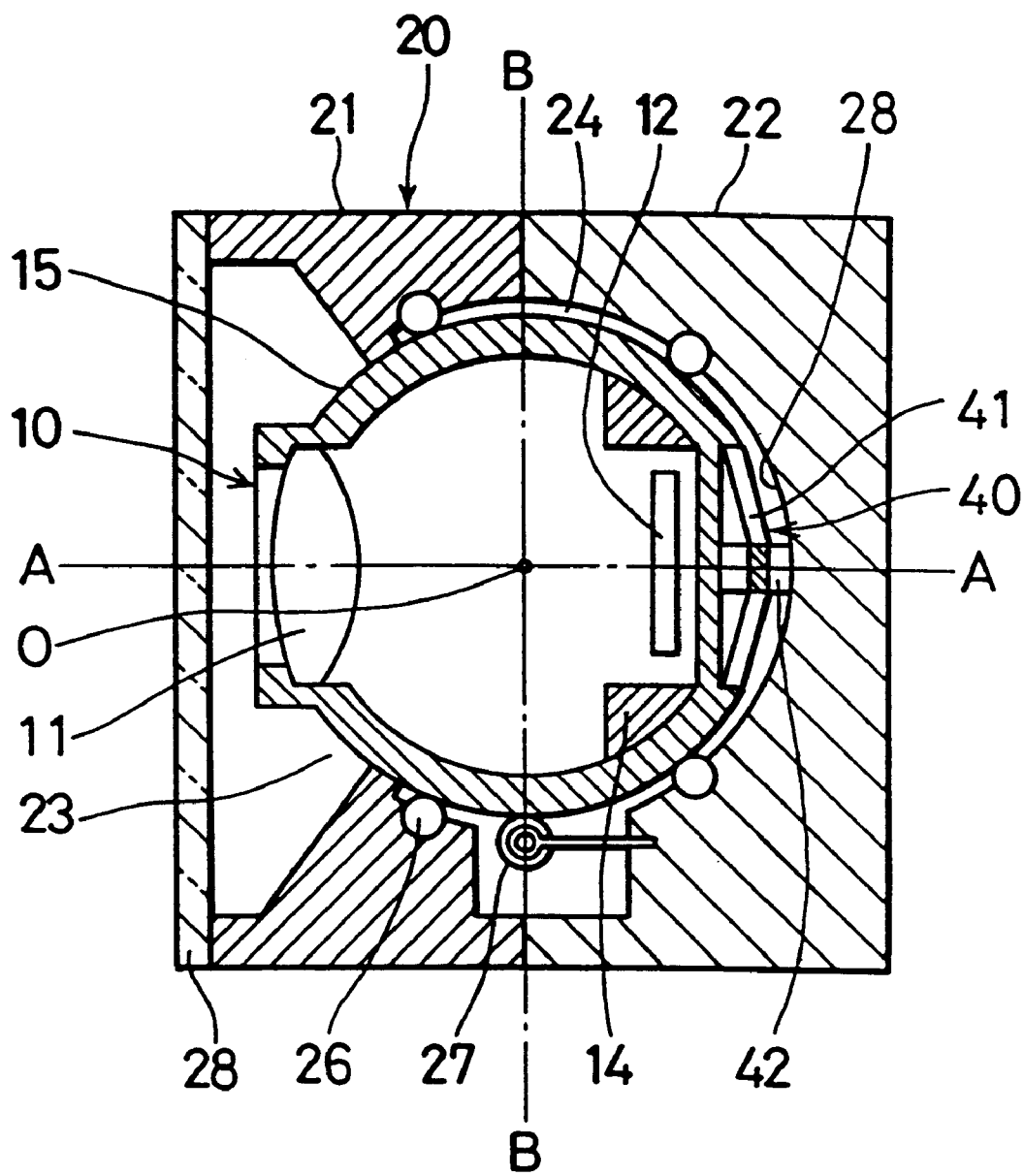
FIG. 14 is a cross-sectional view showing another configuration of the third embodiment.

Furthermore, it is preferable that front of the openings 23 of the housings 20 in the first embodiment shown in FIG. 1, in the fourth embodiment shown in FIG. 16 and in the fifth embodiment shown in FIG. 21 be sealed by the transparent member 28, similar to the second embodiment shown in FIG. 10 or the third embodiment shown in FIG. 14.

Furthermore, in the above-mentioned embodiments, the image pickup unit 10 is driven by the one-dimensional piezoelectric actuators 31 or the two-dimensional piezoelectric actuator 40. For moving the image pickup unit 10 by a smaller driving force due to the piezoelectric actuators 31, it is preferable that the center of gravity of the image pickup unit 10 be immovable. Thus, weight and position of the balance weight 14 are a adjusted to make the center of gravity of the image pickup unit 10 coincide with the center O of the sphere constituting the convex spherical surface 15.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image pickup apparatus comprising:

an image pickup unit containing an image pickup optical lens system and an image pickup device, a portion of an outer surface of said image pickup unit being convex spherical;

a holder for rotatably holding said image pickup unit around an optional axis passing a center of a sphere constituting said convex spherical surface;

a first driving mechanism provided on a first axis passing said center of said sphere and including a friction member pressed on said convex spherical surface and a one-dimensional piezoelectric actuator moving said friction member for applying a revolution force to said image pickup unit in a first direction; and a second driving mechanism provided on a second axis crossing said first axis substantially at right angle and passing said center of said sphere and including a friction member pressed on said convex spherical surface and a one-dimensional piezoelectric actuator moving said friction member for applying a revolution force to said image pickup unit in a second direction.

2. The image pickup apparatus in accordance with claim 1, wherein each of said one-dimensional piezoelectric actuators has two arms which are formed symmetrical with respect to said friction member and has a substantially herringbone shaped cross-section in a plane perpendicular to a contacting surface of said friction member with said convex spherical surface of said image pickup unit, and said one-dimensional piezoelectric actuator comprises piezoelectric plates and electrodes which are laminated in a direction perpendicular to said cross-section.

3. The image pickup apparatus in accordance with claim 1, wherein the center of gravity of said image pickup unit substantially coincides with said center of said sphere.

4. The image pickup apparatus in accordance with claim 1, wherein said image pickup unit is contained in a housing, and said housing has a concave spherical surface facing said convex spherical surface of said image pickup unit and an opening through which an object is focused on said image pickup device by said image pickup optical lens system.

5. The image pickup apparatus in accordance with claim 4, wherein balls are provided between said convex spherical surface of said image pickup unit and said concave spherical surface of said housing, and said friction members are protruded from said concave spherical surface.

6. The image pickup apparatus in accordance with claim 4, wherein a sealing member is provided between an outer surface of said image pickup unit and said opening of said housing.

7. The image pickup apparatus in accordance with claim 4, wherein said opening of said housing is sealed by a transparent member.

8. An image pickup apparatus comprising:

an image pickup unit containing an image pickup optical lens system and an image pickup device, a portion of an outer surface of said image pickup unit being a convex spherical surface;

a holder for rotatably holding said image pickup unit around an optional axis passing a center of a sphere constituting said convex spherical surface; and a driving mechanism provided on an axis passing said center of said sphere and including a friction member pressed on said convex spherical surface and a two-dimensional piezoelectric actuator moving said friction member for applying two directional revolution force to said image pickup unit.

9. The image pickup apparatus in accordance with claim 8, wherein said two-dimensional piezoelectric actuator has four arms radially formed by 90 degrees with respect to said friction member and each two of them, which are not adjoining each other, form a substantially herringbone shape in a cross-section perpendicular to a contacting surface of said friction member with said convex spherical surface of said image pickup unit; and said two-dimensional piezoelectric actuator comprises piezoelectric plates and electrodes which are laminated in a direction perpendicular to said cross-section.

10. The image pickup apparatus in accordance with claim 8, wherein the center of gravity of said image pickup unit substantially coincides with said center of said sphere.

11. The image pickup apparatus in accordance with claim 8, wherein said image pickup unit is contained in a housing; and said housing has a concave spherical surface facing said convex spherical surface of said image pickup unit and an opening through which an object is focused on said image pickup device by said image pickup optical lens system.

12. The image pickup apparatus in accordance with claim 11, wherein balls are provided between said convex spherical surface of said image pickup unit and said concave spherical surface of said housing; and said friction member is protruded from said concave spherical surface.

13. The image pickup apparatus in accordance with claim 11, wherein a sealing member is provided between an outer surface of said image pickup unit and said opening of said housing.

14. The image pickup apparatus in accordance with claim 11, wherein said opening of said housing is sealed by a transparent member.

15. An image pickup apparatus comprising:

an image pickup unit containing an image pickup optical lens system and an image pickup device;

a holder for movably holding said image pickup unit at least in a predetermined direction; and a driving mechanism including a friction member and a piezoelectric actuator for moving said image pickup unit by a friction force acting between said friction member and an outer surface of said image pickup unit.

16. An image pickup apparatus comprising:

an image pickup unit containing an image pickup optical lens system and an image pickup device;

a holder for movably holding said image pickup unit at least in a predetermined direction and having a contacting surface; and a driving mechanism provided on said image pickup unit and including a friction member and a piezoelectric actuator for moving said image pickup unit by a friction force acting between said friction member and said contacting surface of said holder.

\* \* \* \* \*

UNITED STATES PATENT AND TRADEMARK OFFICE
CERTIFICATE OF CORRECTION

PATENT NO. : 6,078,440
DATED : June 20, 2000
INVENTOR(S) : Masyuki UEYAMA

It is certified that error appears in the above-indentified patent and that said Letters Patent is hereby corrected as shown below:

On the cover page, amend the following:

[22] - Filed:

change "June 6, 1998" to --June 8, 1998--.

Signed and Sealed this

Seventeenth Day of April, 2001

Attest:

NICHOLAS P. GODICI

Attesting Officer     Acting Director of the United States Patent and Trademark Office